US011679511B2

(12) United States Patent
Smith et al.

(10) Patent No.: US 11,679,511 B2
(45) Date of Patent: *Jun. 20, 2023

(54) ROBOTIC END EFFECTOR WITH DORSALLY SUPPORTED ACTUATION MECHANISM

(71) Applicant: Sarcos Corp., Salt Lake City, UT (US)

(72) Inventors: Fraser M. Smith, Salt Lake City, UT (US); Brian J. Maclean, Salt Lake City, UT (US)

(73) Assignee: Sarcos Corp., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/667,440

(22) Filed: Feb. 8, 2022

(65) Prior Publication Data

US 2022/0161442 A1    May 26, 2022

Related U.S. Application Data

(63) Continuation of application No. 16/237,609, filed on Dec. 31, 2018, now Pat. No. 11,241,801.

(51) Int. Cl.
| | |
|---|---|
| *B25J 15/00* | (2006.01) |
| *B25J 15/02* | (2006.01) |
| *B25J 15/10* | (2006.01) |
| *B25J 9/14* | (2006.01) |

(52) U.S. Cl.
CPC ......... *B25J 15/0009* (2013.01); *B25J 15/022* (2013.01); *B25J 9/146* (2013.01); *B25J 15/10* (2013.01)

(58) Field of Classification Search
CPC ...... B25J 15/0009; B25J 15/022; B25J 15/10; B25J 15/103; B25J 9/146; Y10S 901/36–39

USPC .................................................. 294/106, 198
See application file for complete search history.

(56) References Cited

U.S. PATENT DOCUMENTS

| | | | |
|---|---|---|---|
| 1,880,138 | A | 9/1932 | Franz |
| 2,850,189 | A | 9/1958 | Leroy |
| 2,981,198 | A | 4/1961 | Nettel |
| 3,171,549 | A | 3/1965 | Orloff |
| 3,280,991 | A | 10/1966 | Melton et al. |
| 3,306,646 | A | 2/1967 | Flora, Jr. |
| 3,358,678 | A | 12/1967 | Kulstar |
| 3,449,008 | A | 6/1969 | Colechia |

(Continued)

FOREIGN PATENT DOCUMENTS

| | | |
|---|---|---|
| CN | 101214653 A | 7/2008 |
| CN | 101823517 A | 9/2010 |

(Continued)

OTHER PUBLICATIONS

International Search Report for International Application No. PCT/US2021/062051 dated Mar. 16, 2022, 29 pages.

(Continued)

*Primary Examiner* — Dean J Kramer

(57) ABSTRACT

A robotic end-effector to provide an anthropomorphic hand with a dorsal actuation system. The hand has a substantially planar palm and fingers extending from the palm and capable of flexion and extension relative to the palm. The dorsal actuation system is supported on the palm and fingers, with actuators positioned at a dorsal side of the palm and links positioned at a dorsal side of the fingers.

45 Claims, 10 Drawing Sheets

(56) References Cited

U.S. PATENT DOCUMENTS

| | | | |
|---|---|---|---|
| 3,449,769 A | 6/1969 | Mizen | |
| 3,535,711 A | 10/1970 | Fick | |
| 3,759,563 A | 9/1973 | Kitamura | |
| 3,858,468 A | 1/1975 | Pasbrig | |
| 4,046,262 A | 9/1977 | Vykukal et al. | |
| 4,179,233 A | 12/1979 | Bromell et al. | |
| 4,200,596 A | 4/1980 | Iiyama et al. | |
| 4,251,791 A | 2/1981 | Yanagisawa et al. | |
| 4,367,891 A * | 1/1983 | Wauer | B25J 15/0009 294/902 |
| 4,398,110 A | 8/1983 | Flinchbaugh et al. | |
| 4,483,407 A | 11/1984 | Iwamoto et al. | |
| 4,561,686 A | 12/1985 | Atchley | |
| 4,567,417 A | 1/1986 | Francois et al. | |
| 4,575,297 A | 3/1986 | Richter | |
| 4,591,944 A | 5/1986 | Gravel | |
| 4,598,601 A | 7/1986 | Molaug | |
| 4,603,896 A | 8/1986 | Vasseur et al. | |
| 4,661,032 A | 4/1987 | Arai | |
| 4,666,357 A | 5/1987 | Babbi | |
| 4,723,353 A | 2/1988 | Monforte | |
| 4,762,455 A | 8/1988 | Coughlan et al. | |
| 4,768,143 A | 8/1988 | Lane et al. | |
| 4,821,594 A | 4/1989 | Rosheim et al. | |
| 4,834,443 A | 5/1989 | Crowder et al. | |
| 4,853,874 A | 8/1989 | Iwamoto et al. | |
| 4,883,400 A | 11/1989 | Kuban et al. | |
| 4,884,720 A | 12/1989 | Whigham et al. | |
| 4,915,437 A | 4/1990 | Cherry | |
| 4,921,292 A | 5/1990 | Harwell et al. | |
| 4,997,095 A | 3/1991 | Jones et al. | |
| 5,004,391 A | 4/1991 | Burdea | |
| 5,038,089 A | 8/1991 | Szakaly | |
| 5,072,361 A | 12/1991 | Davis et al. | |
| 5,080,682 A | 1/1992 | Schectman | |
| 5,101,472 A | 3/1992 | Repperger | |
| 5,105,367 A | 4/1992 | Tsuchihashi et al. | |
| 5,117,814 A | 6/1992 | Luttrell et al. | |
| 5,144,943 A | 9/1992 | Luttrell et al. | |
| 5,172,951 A | 12/1992 | Jacobsen et al. | |
| 5,230,147 A | 7/1993 | Asaoka et al. | |
| 5,239,246 A | 8/1993 | Kim | |
| 5,246,216 A | 9/1993 | Oberst | |
| 5,280,981 A | 1/1994 | Schulz | |
| 5,282,460 A | 2/1994 | Boldt | |
| 5,328,224 A | 7/1994 | Jacobsen et al. | |
| 5,336,982 A | 8/1994 | Backes | |
| 5,389,849 A | 2/1995 | Asano et al. | |
| 5,399,951 A | 3/1995 | Lavallee et al. | |
| 5,402,690 A | 4/1995 | Sekiguchi et al. | |
| 5,516,249 A | 5/1996 | Brimhall | |
| 5,577,417 A | 11/1996 | Fournier | |
| 5,577,902 A | 11/1996 | Todo et al. | |
| 5,588,688 A | 12/1996 | Jacobsen et al. | |
| 5,664,636 A | 9/1997 | Ikuma et al. | |
| 5,704,945 A | 1/1998 | Wagner et al. | |
| 5,762,390 A | 6/1998 | Gosselin et al. | |
| 5,784,542 A | 7/1998 | Ohm et al. | |
| 5,785,505 A | 7/1998 | Price | |
| 5,797,615 A | 8/1998 | Murray | |
| 5,845,540 A | 12/1998 | Rosheim | |
| 5,865,770 A | 2/1999 | Schectman | |
| 5,898,599 A | 4/1999 | Massie et al. | |
| 5,912,658 A | 6/1999 | Bergamasco et al. | |
| 5,949,686 A | 9/1999 | Yoshinada et al. | |
| 5,957,981 A | 9/1999 | Gramnas | |
| 5,961,476 A | 10/1999 | Betto et al. | |
| 5,967,580 A | 10/1999 | Rosheim | |
| 5,994,864 A | 11/1999 | Inoue et al. | |
| 6,016,385 A | 1/2000 | Yee et al. | |
| 6,170,162 B1 | 1/2001 | Jacobsen et al. | |
| 6,202,013 B1 | 3/2001 | Anderson et al. | |
| 6,272,924 B1 | 8/2001 | Jansen | |
| 6,301,526 B1 | 10/2001 | Kim et al. | |
| 6,338,605 B1 | 1/2002 | Halverson et al. | |
| 6,340,065 B1 | 1/2002 | Harris | |
| 6,360,166 B1 | 3/2002 | Alster | |
| 6,394,731 B1 | 5/2002 | Konosu et al. | |
| 6,425,865 B1 | 7/2002 | Salcudean et al. | |
| 6,430,473 B1 | 8/2002 | Lee et al. | |
| 6,435,794 B1 | 8/2002 | Springer | |
| 6,507,163 B1 | 1/2003 | Allen | |
| 6,508,058 B1 | 1/2003 | Seaverson | |
| 6,554,342 B1 | 4/2003 | Burnett | |
| 6,641,371 B2 | 11/2003 | Graziani et al. | |
| 6,659,703 B1 | 12/2003 | Kirkley | |
| 6,659,939 B2 | 12/2003 | Moll et al. | |
| 6,663,154 B2 | 12/2003 | Pancheri | |
| 6,714,839 B2 | 3/2004 | Salisbury, Jr. et al. | |
| 6,740,125 B2 | 5/2004 | Mosier | |
| 6,855,170 B2 | 2/2005 | Gramnas | |
| 6,920,374 B2 | 7/2005 | Takenaka et al. | |
| 7,168,748 B2 | 1/2007 | Townsend et al. | |
| 7,319,919 B2 | 1/2008 | Takenaka et al. | |
| 7,337,040 B2 | 2/2008 | Takenaka et al. | |
| 7,379,789 B2 | 5/2008 | Takenaka et al. | |
| 7,396,057 B2 | 7/2008 | Ye et al. | |
| 7,405,531 B2 | 7/2008 | Khatib et al. | |
| 7,409,882 B2 | 8/2008 | Massimo et al. | |
| 7,410,338 B2 | 8/2008 | Schiele et al. | |
| 7,509,905 B2 | 3/2009 | Jacobsen et al. | |
| 7,628,766 B1 | 12/2009 | Kazerooni et al. | |
| 7,783,384 B2 | 8/2010 | Kraft | |
| 7,862,522 B1 | 1/2011 | Barclay et al. | |
| 7,862,524 B2 | 1/2011 | Carignan et al. | |
| 7,883,546 B2 | 2/2011 | Kazerooni et al. | |
| 7,947,004 B2 | 5/2011 | Kazerooni et al. | |
| 7,965,006 B2 | 6/2011 | Kang et al. | |
| 8,024,071 B2 | 9/2011 | Komatsu et al. | |
| 8,051,764 B2 | 11/2011 | Jacobsen et al. | |
| 8,100,451 B2 | 1/2012 | Okuda et al. | |
| 8,132,835 B2 | 3/2012 | Ban et al. | |
| 8,151,401 B2 | 4/2012 | Cheyne | |
| 8,182,010 B2 | 5/2012 | Lee et al. | |
| 8,204,626 B2 | 6/2012 | Yoshiike et al. | |
| 8,245,728 B2 | 8/2012 | Jacobsen et al. | |
| 8,295,975 B2 | 10/2012 | Arimatsu et al. | |
| 8,336,420 B2 | 12/2012 | Carter et al. | |
| 8,375,982 B2 | 2/2013 | Gray, Jr. | |
| 8,435,309 B2 | 5/2013 | Gilbert et al. | |
| 8,452,447 B2 | 5/2013 | Nixon | |
| 8,473,101 B2 | 6/2013 | Summer | |
| 8,511,192 B2 | 8/2013 | Hirtt et al. | |
| 8,516,918 B2 | 8/2013 | Jacobsen et al. | |
| 8,529,582 B2 | 9/2013 | Devengenzo et al. | |
| 8,534,728 B1 | 9/2013 | Bosscher et al. | |
| 8,560,118 B2 | 10/2013 | Greer et al. | |
| 8,640,723 B2 | 2/2014 | Jacobsen et al. | |
| 8,667,643 B2 | 3/2014 | Simonelli et al. | |
| 8,672,378 B2 | 3/2014 | Yamasaki et al. | |
| 8,747,486 B2 | 6/2014 | Kawasaki et al. | |
| 8,794,262 B2 | 8/2014 | Jacobsen et al. | |
| 8,821,338 B2 | 9/2014 | Thorson | |
| 8,849,457 B2 | 9/2014 | Jacobsen et al. | |
| 8,870,967 B2 | 10/2014 | Herr et al. | |
| 8,881,616 B2 | 11/2014 | Dize et al. | |
| 8,888,864 B2 | 11/2014 | Iverson et al. | |
| 8,892,258 B2 | 11/2014 | Jacobsen et al. | |
| 8,920,517 B2 | 12/2014 | Smith et al. | |
| 8,942,846 B2 | 1/2015 | Jacobsen et al. | |
| 8,977,388 B2 | 3/2015 | Jacobsen et al. | |
| 8,977,398 B2 | 3/2015 | Jacobsen et al. | |
| 9,205,560 B1 | 12/2015 | Edsinger et al. | |
| 9,295,604 B2 | 3/2016 | Zoss et al. | |
| 9,314,921 B2 | 4/2016 | Jacobsen et al. | |
| 9,329,587 B2 | 5/2016 | Fudaba et al. | |
| 9,333,097 B2 | 5/2016 | Herr et al. | |
| 9,526,636 B2 | 12/2016 | Bedard et al. | |
| 9,533,411 B2 | 1/2017 | Jacobsen et al. | |
| 9,616,580 B2 | 4/2017 | Smith et al. | |
| 9,618,937 B1 | 4/2017 | Blankespoor et al. | |
| 9,643,323 B2 | 5/2017 | Nagatsuka et al. | |
| 9,789,603 B2 | 10/2017 | Jacobsen et al. | |
| 9,895,812 B2 | 2/2018 | Gonzalez et al. | |

(56) References Cited

U.S. PATENT DOCUMENTS

| | | |
|---|---|---|
| 9,926,025 B1 | 3/2018 | Blankespoor et al. |
| 10,028,844 B2 | 7/2018 | Cheng et al. |
| 10,071,485 B2 | 9/2018 | Schiele et al. |
| 10,216,177 B2 | 2/2019 | Gildert et al. |
| 10,300,969 B1 | 5/2019 | Blackespoor et al. |
| 10,406,676 B2 | 9/2019 | Smith et al. |
| 10,512,583 B2 | 12/2019 | Smith |
| 10,533,542 B2 | 1/2020 | Smith et al. |
| 10,561,564 B2 | 2/2020 | LaChappelle et al. |
| 10,566,914 B2 | 2/2020 | Fujita et al. |
| 10,765,537 B2 | 9/2020 | Smith et al. |
| 10,828,767 B2 | 11/2020 | Smith et al. |
| 11,148,279 B1 | 10/2021 | Mooney et al. |
| 11,241,801 B2 * | 2/2022 | Smith .................... B25J 15/022 |
| 2001/0033146 A1 | 10/2001 | Kato et al. |
| 2001/0043847 A1 | 11/2001 | Kramer |
| 2002/0075233 A1 | 6/2002 | White et al. |
| 2002/0094919 A1 | 7/2002 | Rennex et al. |
| 2003/0005896 A1 | 1/2003 | Jacobsen et al. |
| 2003/0146720 A1 | 8/2003 | Riwan et al. |
| 2003/0152452 A1 | 8/2003 | Hodgson |
| 2003/0223844 A1 | 12/2003 | Schiele et al. |
| 2004/0004362 A1 | 1/2004 | Love |
| 2004/0037681 A1 | 2/2004 | Marcotte |
| 2004/0102723 A1 | 5/2004 | Horst |
| 2004/0106881 A1 | 6/2004 | McBean et al. |
| 2004/0116836 A1 | 6/2004 | Kawai et al. |
| 2004/0246769 A1 | 12/2004 | Ido |
| 2004/0250644 A1 | 12/2004 | Gosselin et al. |
| 2005/0059908 A1 | 3/2005 | Bogert |
| 2005/0099386 A1 | 5/2005 | Kukita |
| 2005/0159850 A1 | 7/2005 | Melman |
| 2005/0166413 A1 | 8/2005 | Crampton |
| 2005/0193451 A1 | 9/2005 | Quistgaard et al. |
| 2005/0251110 A1 | 11/2005 | Nixon |
| 2006/0052732 A1 | 3/2006 | Shimada et al. |
| 2006/0064047 A1 | 3/2006 | Shimada et al. |
| 2006/0069449 A1 | 3/2006 | Bisbee, III et al. |
| 2006/0130594 A1 | 6/2006 | Ikeuchi |
| 2006/0149419 A1 | 7/2006 | Ogawa et al. |
| 2006/0184275 A1 | 8/2006 | Hosokawa et al. |
| 2006/0197049 A1 | 9/2006 | Hamada et al. |
| 2006/0245897 A1 | 11/2006 | Hariki et al. |
| 2006/0249315 A1 | 11/2006 | Herr et al. |
| 2007/0054777 A1 | 3/2007 | Kawai et al. |
| 2007/0056592 A1 | 3/2007 | Angold et al. |
| 2007/0105070 A1 | 5/2007 | Trawick |
| 2007/0123997 A1 | 5/2007 | Herr et al. |
| 2007/0129653 A1 | 6/2007 | Sugar et al. |
| 2008/0009771 A1 | 1/2008 | Perry et al. |
| 2008/0023974 A1 | 1/2008 | Park et al. |
| 2008/0156363 A1 | 7/2008 | Ikeuchi et al. |
| 2008/0269027 A1 | 10/2008 | Chen |
| 2008/0271942 A1 | 11/2008 | Yamashita et al. |
| 2008/0281468 A1 | 11/2008 | Jacobsen et al. |
| 2009/0036815 A1 | 2/2009 | Ido |
| 2009/0038258 A1 | 2/2009 | Pivac et al. |
| 2009/0039579 A1 | 2/2009 | Clifford et al. |
| 2009/0199883 A1 | 8/2009 | Hiki |
| 2009/0210093 A1 | 8/2009 | Jacobsen et al. |
| 2009/0294238 A1 | 12/2009 | Gilmore |
| 2010/0050947 A1 | 3/2010 | Kortekaas |
| 2010/0089855 A1 | 4/2010 | Kjolseth |
| 2010/0094185 A1 | 4/2010 | Amundson et al. |
| 2010/0152630 A1 | 6/2010 | Matsuoka et al. |
| 2010/0198402 A1 | 8/2010 | Greer et al. |
| 2010/0234996 A1 | 9/2010 | Schreiber et al. |
| 2010/0241242 A1 | 9/2010 | Herr et al. |
| 2010/0295497 A1 | 11/2010 | Takamatsu |
| 2011/0010012 A1 | 1/2011 | Murayama et al. |
| 2011/0040216 A1 | 2/2011 | Herr et al. |
| 2011/0046781 A1 | 2/2011 | Summer |
| 2011/0066088 A1 | 3/2011 | Little et al. |
| 2011/0071677 A1 | 3/2011 | Stillman |
| 2011/0214524 A1 | 9/2011 | Jacobsen et al. |
| 2011/0219899 A1 | 9/2011 | Dize et al. |
| 2011/0264230 A1 | 10/2011 | Herr et al. |
| 2012/0000891 A1 | 1/2012 | Nakanishi et al. |
| 2012/0060322 A1 | 3/2012 | Simonelli et al. |
| 2012/0065902 A1 | 3/2012 | Nakajima |
| 2012/0073930 A1 | 3/2012 | Lansberry et al. |
| 2012/0137667 A1 | 6/2012 | Jacobsen et al. |
| 2012/0179075 A1 | 7/2012 | Perry et al. |
| 2012/0191245 A1 | 7/2012 | Fudaba et al. |
| 2012/0216671 A1 | 8/2012 | Gammon |
| 2012/0237319 A1 | 9/2012 | Jacobsen et al. |
| 2012/0259429 A1 | 10/2012 | Han et al. |
| 2012/0277901 A1 | 11/2012 | Jacobsen et al. |
| 2012/0277911 A1 | 11/2012 | Jacobsen et al. |
| 2012/0277915 A1 | 11/2012 | Jacobsen et al. |
| 2012/0328395 A1 | 12/2012 | Jacobsen et al. |
| 2013/0011220 A1 | 1/2013 | Jacobsen et al. |
| 2013/0013108 A1 | 1/2013 | Jacobsen et al. |
| 2013/0023803 A1 | 1/2013 | Hsu et al. |
| 2013/0033050 A1 | 2/2013 | Matsuoka et al. |
| 2013/0057001 A1 | 3/2013 | Tsai |
| 2013/0090580 A1 | 4/2013 | Hong et al. |
| 2013/0106127 A1 | 5/2013 | Lipson et al. |
| 2013/0106128 A1 | 5/2013 | Yamasaki et al. |
| 2013/0192406 A1 | 8/2013 | Godowski |
| 2013/0226048 A1 | 8/2013 | Unluhisarcikili et al. |
| 2013/0253385 A1 | 9/2013 | Goffer et al. |
| 2013/0296746 A1 | 11/2013 | Herr et al. |
| 2013/0302129 A1 | 11/2013 | Smith et al. |
| 2013/0306430 A1 | 11/2013 | Laffranchi et al. |
| 2013/0331744 A1 | 12/2013 | Kamon |
| 2013/0333368 A1 | 12/2013 | Durfee et al. |
| 2014/0088728 A1 | 3/2014 | Herr |
| 2014/0100492 A1 | 4/2014 | Nagasaka |
| 2014/0190289 A1 | 7/2014 | Zhu |
| 2014/0195052 A1 | 7/2014 | Tsusaka et al. |
| 2015/0073595 A1 | 3/2015 | Fudaba et al. |
| 2015/0073596 A1 | 3/2015 | Fudaba et al. |
| 2015/0173929 A1 | 6/2015 | Kazerooni et al. |
| 2015/0209214 A1 | 7/2015 | Herr et al. |
| 2015/0217457 A1 | 8/2015 | Lipson et al. |
| 2015/0272749 A1 | 10/2015 | Amend, Jr. et al. |
| 2015/0278263 A1 | 10/2015 | Bowles et al. |
| 2015/0289995 A1 | 10/2015 | Wilkinson et al. |
| 2015/0321340 A1 | 11/2015 | Smith |
| 2015/0321342 A1 | 11/2015 | Smith et al. |
| 2016/0003268 A1 | 1/2016 | Shevchenko et al. |
| 2016/0114482 A1 | 4/2016 | Lessing et al. |
| 2016/0153508 A1 | 6/2016 | Battlogg |
| 2016/0279788 A1 | 9/2016 | Kanaoka et al. |
| 2016/0331556 A1 | 11/2016 | Wijesundara et al. |
| 2016/0331572 A1 | 11/2016 | Popovic et al. |
| 2016/0332302 A1 | 11/2016 | Bingham et al. |
| 2016/0332305 A1 | 11/2016 | Gonzalez et al. |
| 2016/0332312 A1 | 11/2016 | Song et al. |
| 2017/0050310 A1 | 2/2017 | Kanaoka |
| 2017/0326737 A1 | 11/2017 | Martin et al. |
| 2018/0126548 A1 | 5/2018 | Sugito et al. |
| 2018/0133905 A1 | 5/2018 | Smith et al. |
| 2018/0133906 A1 | 5/2018 | Smith et al. |
| 2018/0193172 A1 | 7/2018 | Smith et al. |
| 2018/0193999 A1 | 7/2018 | Jacobsen et al. |
| 2018/0194000 A1 | 7/2018 | Smith et al. |
| 2018/0221237 A1 | 8/2018 | Swift et al. |
| 2018/0290309 A1 | 10/2018 | Becker et al. |
| 2018/0298976 A1 | 10/2018 | Battlogg |
| 2019/0022853 A1 | 1/2019 | Kim et al. |
| 2019/0105777 A1 | 4/2019 | Dalley et al. |
| 2019/0138423 A1 | 5/2019 | Agerstam et al. |
| 2019/0176320 A1 | 6/2019 | Smith et al. |
| 2019/0184576 A1 | 6/2019 | Smith et al. |
| 2020/0001450 A1 | 1/2020 | Smith et al. |
| 2020/0164523 A1 * | 5/2020 | Hallock .................... B25J 9/06 |
| 2020/0281803 A1 | 9/2020 | Teng et al. |
| 2020/0312109 A1 | 10/2020 | Shionozaki |
| 2020/0346009 A1 | 11/2020 | Murray et al. |
| 2020/0368094 A1 | 11/2020 | Yoshimi et al. |
| 2020/0405417 A1 | 12/2020 | Shelton, IV et al. |
| 2021/0039269 A1 | 2/2021 | Son |

(56) References Cited

U.S. PATENT DOCUMENTS

| | | | |
|---|---|---|---|
| 2021/0059780 A1 | 3/2021 | Sutherland et al. |
| 2021/0369536 A1 | 12/2021 | Mooney et al. |
| 2021/0378903 A1 | 12/2021 | Mooney et al. |
| 2023/0023083 A1 | 1/2023 | Shelton, IV et al. |

FOREIGN PATENT DOCUMENTS

| | | |
|---|---|---|
| CN | 103610524 A | 3/2014 |
| CN | 203495949 U | 3/2014 |
| CN | 103802907 A | 5/2014 |
| CN | 203752160 U | 8/2014 |
| CN | 104843484 A | 8/2015 |
| CN | 105411813 A | 3/2016 |
| CN | 205250544 U | 5/2016 |
| CN | 105818143 A | 8/2016 |
| CN | 107471203 A | 12/2017 |
| CN | 108081303 A | 5/2018 |
| CN | 111267992 A | 6/2020 |
| DE | 102004029513 B3 | 9/2005 |
| DE | 102010029088 A1 | 11/2011 |
| DE | 202013009698 U1 | 11/2013 |
| DE | 102016201540 A1 | 8/2017 |
| EP | 0039578 A1 | 11/1981 |
| EP | 0616275 A3 | 9/1998 |
| EP | 1037264 A2 | 9/2000 |
| EP | 1258324 A2 | 11/2002 |
| EP | 1442846 A1 | 8/2004 |
| EP | 1721593 A1 | 11/2006 |
| EP | 2198810 A1 | 6/2010 |
| EP | 2548543 B1 | 1/2015 |
| EP | 2942162 A2 | 11/2015 |
| EP | 2168548 B1 | 10/2016 |
| FR | 2651220 A1 | 3/1991 |
| GB | 686237 A | 1/1953 |
| GB | 2278041 A | 11/1994 |
| JP | S34-015764 | 10/1959 |
| JP | S36-005228 | 5/1961 |
| JP | S44-000603 | 1/1969 |
| JP | S50-009803 | 1/1975 |
| JP | S50-006043 | 3/1975 |
| JP | S52-013252 A | 2/1977 |
| JP | S52-134985 A | 11/1977 |
| JP | S56-140510 A | 11/1981 |
| JP | S58-113586 A | 7/1983 |
| JP | S58-45724 B2 | 10/1983 |
| JP | S60-177883 U | 11/1985 |
| JP | S62-193784 A | 8/1987 |
| JP | S62-200600 A | 9/1987 |
| JP | H01-295772 A | 11/1989 |
| JP | H02-51083 U | 4/1990 |
| JP | H03-85398 U | 8/1991 |
| JP | H04-44296 U | 4/1992 |
| JP | H05-004177 A | 1/1993 |
| JP | H05-23989 A | 2/1993 |
| JP | H06-213266 A | 8/1994 |
| JP | H06-315879 A | 11/1994 |
| JP | H07-001366 A | 1/1995 |
| JP | H07-5129 Y2 | 2/1995 |
| JP | H07-060679 A | 3/1995 |
| JP | H07-112377 A | 5/1995 |
| JP | H07-031291 U | 6/1995 |
| JP | H07-246578 A | 9/1995 |
| JP | H08-126984 A | 5/1996 |
| JP | H09-11176 A | 1/1997 |
| JP | H1156931 | 3/1999 |
| JP | H11-130279 A | 5/1999 |
| JP | 2002-161547 A | 6/2002 |
| JP | 2003-103480 A | 4/2003 |
| JP | 2003-194104 A | 7/2003 |
| JP | 2004-105261 A | 4/2004 |
| JP | 2004-195576 A | 7/2004 |
| JP | 2005-118938 A | 5/2005 |
| JP | 2005-237504 A | 9/2005 |
| JP | 2005-334999 A | 12/2005 |
| JP | 2006-007337 A | 1/2006 |
| JP | 2006-016916 A | 1/2006 |
| JP | 2006-028953 A | 2/2006 |
| JP | 2006-051558 A | 2/2006 |
| JP | 2006-167223 A | 6/2006 |
| JP | 3909770 B2 | 4/2007 |
| JP | 2007-130234 A | 5/2007 |
| JP | 2007-252514 A | 10/2007 |
| JP | 2007-307216 A | 11/2007 |
| JP | 2008-143449 A | 6/2008 |
| JP | 2009-023828 A | 2/2009 |
| JP | 2009-167673 A | 7/2009 |
| JP | 2009-178253 A | 8/2009 |
| JP | 2009-219650 A | 10/2009 |
| JP | 2009-240488 A | 10/2009 |
| JP | 2009-268839 A | 11/2009 |
| JP | 2010-098130 A | 4/2010 |
| JP | 2010-110381 A | 5/2010 |
| JP | 2010-110465 A | 5/2010 |
| JP | 2010-142351 A | 7/2010 |
| JP | 2010-263761 A | 11/2010 |
| JP | 2011-156171 A | 8/2011 |
| JP | 2011-193899 A | 10/2011 |
| JP | 2011-230260 A | 11/2011 |
| JP | 2012-501739 A | 1/2012 |
| JP | 2012-125279 A | 7/2012 |
| JP | 2012-176476 A | 9/2012 |
| JP | 2013-022091 A | 2/2013 |
| JP | 2013-090693 A | 5/2013 |
| JP | 2013-123786 A | 6/2013 |
| JP | 2013-142445 A | 7/2013 |
| JP | 5267730 | 8/2013 |
| JP | 2013-208293 A | 10/2013 |
| JP | 2013-220496 A | 10/2013 |
| JP | 2013-248699 A | 12/2013 |
| JP | 2014-054273 A | 3/2014 |
| JP | 2014-073222 A | 4/2014 |
| JP | 2014-200853 A | 10/2014 |
| JP | 2015-112649 A | 6/2015 |
| JP | 2015-212010 A | 11/2015 |
| JP | 2015-214019 A | 12/2015 |
| JP | 2016-539017 A | 12/2016 |
| JP | 2018-167375 | 11/2018 |
| JP | 2020-037164 A | 3/2020 |
| JP | 6748374 B2 | 9/2020 |
| KR | 2005-0037754 A | 4/2005 |
| KR | 2007-0057209 A | 6/2007 |
| KR | 2010-0112670 | 10/2010 |
| KR | 2012-0105194 A | 9/2012 |
| KR | 10-1219795 | 1/2013 |
| KR | 2013-0001409 A | 1/2013 |
| KR | 2013-0045777 A | 5/2013 |
| KR | 2018-0128731 A | 12/2018 |
| SE | 515372 C2 | 7/2001 |
| WO | WO 2003/002309 A1 | 1/2003 |
| WO | WO 2003/081762 A1 | 10/2003 |
| WO | WO 2007/144629 A2 | 12/2007 |
| WO | WO 2009/143377 A2 | 11/2009 |
| WO | WO 2010/025409 A1 | 3/2010 |
| WO | WO 2010/027968 A2 | 3/2010 |
| WO | WO 2012/042471 A1 | 4/2012 |
| WO | WO 2016/049622 A1 | 3/2016 |
| WO | WO 2017/148499 A1 | 9/2017 |
| WO | WO 2017/159504 A1 | 9/2017 |
| WO | WO 2018/118004 A1 | 6/2018 |
| WO | WO 2018/211869 A1 | 11/2018 |
| WO | WO 2018/215705 A1 | 11/2018 |
| WO | WO 2019/060791 A1 | 3/2019 |
| WO | WO 2020/175949 A1 | 9/2020 |

OTHER PUBLICATIONS

International Search Report for International Application No. PCT/US2021/062052 dated Apr. 7, 2022, 19 pages.
International Search Report for International Application No. PCT/US2021/062053 dated Mar. 17, 2022, 16 pages.
International Search Report for International Application No. PCT/US2021/062055 dated Mar. 30, 2022, 15 pages.

(56) References Cited

OTHER PUBLICATIONS

International Search Report for International Application No. PCT/US2021/062056 dated Apr. 4, 2022, 16 pages.
Extended European Search Report dated Feb. 22, 2022 in EP Application No. 21184013.7 filed May 6, 2015, 9 pages.
Aghili et al., Sensing the torque in a robot's joints, www.memagazine.org/backissues/september98/features/torque/torque.html, 1998, pp. 1-9, The American Society of Mechanical Engineers.
Aliens (Movie), Starring Sigourney Weaver, Directed by James Cameron, Written by James Cameron, David Giler, Walter Hill, Dan O'Bannon, and Ronald Shuset, Released 1985 by Twentieth Century Fox, Scenes at Playtime 88:26:31-00:26:59 & 00:27:40-00:28:05 & 02:08:25-02:10:39 Non-Patent Literature documentation; Aliens(1986)—IMDb; downloaded Sep. 27, 2014; 4 pages; http://www.imdb.com/title/u10090605/.
Amikabir University of Technology, Manipulator Dynamics (Power Point), Computer Engineering and Information Technology Department, to the best of applicant's knowledge article was available before the application filing date, 44 pages.
Barras, Stabilization of a Biped Robot with its arms—A Practical Approach, http://biorob.epfl.ch/files/content/sites/biorob/filed/users/170220/public/Report.pdf; May 2010, 33 pages, EPFL Biorobotics Laboratory (BioRob), Switzerland.
Bauman, Utah Firm Markets on Big Gorilla of an Arm, Deseret News; Jan. 27, 1993, 2 pages, Deseret News Publishing Company, Salt Lake City, Utah.
Claeyssen et al., Magnetostrictive actuators compared to piezoelectric actuators, Proceedings of SPIE—The International Society for Optical Engineering 4763, Mar. 2003, 6 pages.
Digital World Tokyo, Giant Robot Grabbing Hands Grab All They Can, www.digitalworldtokyo.com/index.php/digital_tokyo/articles/giant_robot_grabbing_hands_grab_all_they_can/, Jul. 17, 2007, 3 pages.
Elliott et al., The Biomechanics and Energetics of Human Running using an Elastic Knee Exoskeleton, Jun. 2013, 7 pages, IEEE International Conference on Rehabilitation Robotics, Seattle, Washington.
Elliott et al., Design of a Clutch-Spring Knee Exoskeleton for Running, Journal of Medical Devices, Sep. 2014, 11 pages, vol. 8, The American Society of Mechanical Engineers, New York City, New York.
Endo et al., A quasi-passive model of human leg function in level-ground walking, 2006 IEEE/RSJ International Conference on Intelligent Robots and Systems, Oct. 9-15, 2006, pp. 4935-4939, Institute of Electrical and Electronics Engineers, Piscataway, New Jersey.
Gauthier et al., Magnetic Shape Memory Alloy and Actuator Design, Conference: 5th International Workshop on Microfactories (IWMF'06), Oct. 2006, 5 pages, Besançon, France.
Grabowski et al., Exoskeletons for Running and Hopping Augmentation, Journal of Applied Physiology, http://biomech.media.mit.edu/portfolio_page/load-bearing-exoskeleton-for-augmentation-of-human-running/, 2009, 4 pages, vol. 107, No. 3, American Physiological Society, United States.
Hauser et al., JammJoint: A Variable Stiffness Device Based on Granular Jamming for Wearable Joint Support, IEEE Robotics and Automation Letters, Apr. 2017, 7 pages, vol. 2, Issue 2, Institute of Electrical and Electronics Engineers, Piscataway, New Jersey.
Huber et al., The selection of mechanical actuators based on performance indices, Oct. 8, 1997, pp. 2185-2205, vol. 453 Issue 1965, The Royal Society, London.
Hunter et al., Fast Reversible NiTi Fibers For Use In Microrobotics, Proceedings. IEEE Micro Electro Mechanical Systems, Jan. 30-Feb. 2, 1991, pp. 166-170, Institute of Electrical and Electronics Engineers, Piscataway, New Jersey.
Industrial Magnetics, Inc., PowerLift® Magnets; www.magnetics.com/product.asp?ProductID=1; as accessed Nov. 6, 2012, 2 pages; Boyne City, Michigan.
Jacobsen et al., Design of the Utah/M.I.T. Dextrous Hand, IEEE International Conference on Robotics and Automation, 1986, pp. 1520-1532, Institute of Electrical and Electronics Engineers, Piscataway, New Jersey.
Jacobsen et al., Development of the Utah Artificial Arm, IEEE Transactions on Biomedical Engineering, Apr. 1982, pp. 249-269, vol. BME-29, No. 4, Institute of Electrical and Electronics Engineers, Piscataway, New Jersey.
Jacobsen et al., Research Robots for Application in AI, Teleoperation and Entertainment, Proceedings of the International Fluid Power Exposition and Technical Conference, Mar. 24-24, 1992, pp. 1-19, Chicago, Illinois.
Jacobsen et al., Research Robots for Applications in Artificial Intelligence, Teleoperation and Entertainment; The International Journal of Robotics Research; Apr.-May 2004, pp. 319-330, vol. 23, No. 4-5, Sage Publications, Thousand Oaks, California.
Jacobsen, Science, Robotics, and Superheroes, Presented at Department of Science University of Utah Science at Breakfast, Mar. 17, 2010, 16 pages.
Jafari et al., A Novel Actuator with Adjustable Stiffness (AwAS), Oct. 18-22, 2010, 6 pages, IEEE/RSJ International Conference on Intelligent Robots and Systems, Taiwan.
Jansen et al., Exoskeleton for Soldier Enhancement Systems Feasibility Study, Sep. 2000, 44 pages, Oak Ridge National Laboratory, Oak Ridge, Tennessee.
Kazerooni, Berkeley Lower Extremity Exoskeleton (BLEEX), to the best of applicant's knowledge article was available before the application filing date, 3 pages, University of California, Berkeley, Berkeley, California.
Kim, Development of a small 6-axis force/moment sensor for robot's fingers, Measurement Science and Technology, Sep. 30, 2004, 2 pages, Issue 11, Institute of Physics and IOP Publishing Limited.
Kim et al, A Force Reflected Exoskeleton-Type Masterarm for Human-Robot Interaction, IEEE Transactions on Systems, Man and Cybertentics—Part A: Systems and Humans, Mar. 2005, pp. 198-212, vol. 35, No. 2, Institute of Electrical and Electronics Engineers, Piscataway, New Jersey.
Kulick, An Unpowered Exoskeleton Springs Into Action: Researchers Increase Walking Efficiency, http://www.cmu.edu/me/news/archive/2015/collins-clutch.html, Apr. 1, 2015, 2 pages, Carnegie Mellon University Mechanical Engineering, Pittsburgh, Pennsylvania.
Laliberte et al., Underactuation in Space Robotic Hands, Proceeding of the 6th International Symposium on Artificial Intelligence and Robotics & Automation in Space, Jun. 18-22, 2001, 8 pages, Canadian Space Agency, Canada.
Magnetic Base, www.ask.com/wiki/magnetic_base; page last updated Sep. 12, 2012, 2 pages, retrieved from www.ask.com/wiki/magnetic_base.
Miao et al., Mechanical Design of Hybrid Leg Exoskeleton to Augment Load-Carrying for Walking, International Journal of Advanced Robotic Systems, Mar. 28, 2013, 11 pages, vol. 10, Intech open science open minds, Europe.
Mirfakhrai et al., Polymer artificial muscles, materialstoday, Apr. 2007, pp. 30-38, vol. 10 No. 4, Elsevier, Netherlands.
Mombaur et al., HEiKA-EXO: Optimization-based development and control of an exoskeleton for medical applications, http://typo.iwr.uni-heidelberg.de/groups/orb/research/heika-exo/. Optimization in Robotics & Biomechanics, Oct. 20, 2014, 3 pages, Germany.
Moosavian et al., Dynamics Modeling and Tip-Over Stability of Suspended Wheeled Mobile Robots with Multiple Arms, 2007 IEEE/RSJ International Conference on Intelligent Robots and Systems, Oct. 29-Nov. 2, 2007; pp. 1210-1215, Institute of Electrical and Electronics Engineers, Piscataway, New Jersey.
Newport Corporation, Heavy-Duty Magnetic Base, 300 lb (1334 N) Holding Force, ¼20 Thread, http://search.newport.com/?q=*&x2=sku&q2=200, as accessed Apr. 23, 2011, 1 page, Irvine, CA.
Oak Ridge National Laboratory, Foot Force-Torque Sensor Novel Sensor for Measuring Forces and Torques at the Foot, www.ornl.gov, to the best of applicant's knowledge article was available before the application filing date, 1 page, Oak Ridge National Laboratory, Oak Ridge, Tennessee.

(56) References Cited

OTHER PUBLICATIONS

Omega, Load Cell Designs, www.omega.com/literature/transactions/volume3/load3.html, Nov. 1, 2005, 3 pages.
Ostling, Wearable Robots, Technology Review, Jul./Aug. 2004, pp. 70-73, Elizabeth Bramson-Boudreau, Cambridge, Massachusetts.
Pan, Improved Design of a Three-degree of Freedom Hip Exoskeleton Based on Biomimetic Parallel Structure, Jul. 2011, 132 pages, University of Ontario Institute of Technology, Canada.
Pelrine et al., Electrostriction of polymer dielectrics with compliant electrodes as a means of actuation, Sensors and Actuators A: Physical, Jan. 1998, pp. 77-85, vol. 64 Issue 1, Elsevier, Netherlands.
Pelrine et al., High-field deformation of elastomeric dielectrics for actuators, Materials Science and Engineering, Nov. 28, 2000, pp. 89-100, vol. 11 Issue 2, Elsevier, Netherlands.
Pelrine et al., Dielectric Elastomer Artificial Muscle Actuators: Toward Biomimetic Motion, Proceedings of SPIE—The International Society for Optical Engineering, Jul. 2002, pp. 126-137, vol. 4695, SPIE, Bellingham, WA.
Pin, Wearable Robotics Presented to New Horizons in Science Briefing, Oct. 2003, 34 pages, Knoxville, Tennessee.
Pratt et al., The RoboKnee: An Exoskeleton for Enhancing Strength and Endurance During Walking, International Conference on Robotics & Automation, Apr. 2004, 6 pages, IEEE, New Orleans, LA.
Robotics Research Group, Degrees of Freedom, www.robotics.utexas.edu/rrg/learn_more/low_ed/dof/, Oct. 25, 2006, 2 pages, University of Texas.
Rouse et al., Clutchable Series-Elastic Actuator: Design of a Robotic Knee Prosthesis for Minimum Energy Consumption, 2013 IEEE 13th International Conference on Rehabilitation Robotics (ICORR), Jun. 24-26, 2013, 6 pages, Institute of Electrical and Electronics Engineers, Piscataway, New Jersey.
Schuler et al., Dextrous Robot Arm, In Proceedings of the $8^{th}$ ESA Workshop on Advanced Space Technologies for Robotic and Automation 'ASTRA 2004' ESTEC, Nov. 2-4, 2004, 8 pages, Noordwijk, The Netherlands.
Searchmap Blog, Scientists Develop Mechanical Spring-Loaded Leg Brace to Improve Walking, http://www.searchmap.en/blog/scientists-develop-mechanical-spring-loaded-leg-brace-to-improve-walking/, Apr. 1, 2015, 5 pages, Searchmap Blog.
Seppala, These exoskeleton heels could help stroke victims walk again, https://www.engadget.com/2015/04/02/feet-exoskeletons/, Apr. 2, 2015, Engadget, San Francisco, California.
Shamaei et al., Estimation of Quasi-Stiffness of the Human Knee in the Stance Phase of Walking, Mar. 22, 2013, 10 pages, vol. 8 Issue 3, PLOS One, San Francisco, California.
Siddharth et al., Design and Analysis of a 1-DOF Walking Mechanism, http://siddharthswaminathan.in/files/WalkingMechanism.pdf , Nov. 2012, 7 pages, India.
Smith et al., Integrated thin-film piezoelectric traveling wave ultrasonic motors, Sensors and Actuators A: Physical, Dec. 2012, pp. 305-311, vol. 188, Elsevier, Netherlands.
Song et al, Kinematics Analysis and Implementation of a Motion-Following Task for a Humanoid Slave Robot Controlled by an Exoskeleton Master Robot, International Journal of Control, Automation and Systems, Dec. 2007, pp. 681-690, vol. 5, No. 6, Korean Institute of Electrical Engineers, South Korea.
Suitx, Phoenix Medical Exoskeleton, https://www.suitx.com/phoenix-medical-exoskeleton, 3 pages, to the best of the applicant's knowledge article was available before the application filing date, US Bionics, Inc., Berkeley, California.
Suleiman, Engineering an affordable exoskeleton, Phys.org, https://phys.org/news/2014-06-exoskeleton.html, Jun. 12, 2014, 5 pages, Science X Network.
Tmsuk, Rescue Robot "T-53" release Control Technologies to Control the Synchronous Operation of the Arm, http://robot.watch.impress.co.jp/cda/news/2007/07/18/564.html, as accessed Sep. 1, 2011 5 pages, Robot Watch website.
Ueda et al., Large Effective-Strain Piezoelectric Actuators Using Nested Cellular Architecture With Exponential Strain Amplification Mechamsms, IEEE/ASME Transactions on Mechatronics, Oct. 2010, pp. 770-782, vol. 15 Issue 5, Institute of Electrical and Electronics Engineers, Piscataway, New Jersey.
Vanderborght et al., Variable impedance actuators: A review, Robotics and Autonomous Systems, Dec. 2013, 14 pages, vol. 61, Issue 12, Elsevier, Netherlands.
Walsh, Biomimetic Design of an Under-Actuated Leg Exoskeleton For Load-Carrying Augmentation, Massachusetts Institute of Technology, Feb. 2006, 97 pages, Massachusetts.
Walsh et al., A Quasi-Passive Leg Exoskeleton for Load-Carrying Augmentation, International Journal of Humanoid Robotics, Mar. 8, 2007, 20 pages, vol. 4, No. 3, World Scientific Publishing Company.
Wang et al., A highly-underactuated robotic hand with force and joint angle sensors, 2011 IEEE/RSJ International Conference on Intelligent Robots and Systems, Sep. 25-30, 2011, 6 pages, Institute of Electrical and Electronics Engineers, Piscataway, New Jersey.
Yeates, Utah-built robot safeguards the workplace, http://www.ksl.com?nid=148&sid=17654421&autostart=y; Oct. 13, 2011, 3 pages, KSL Broadcasting, Salt Lake City, Utah.
Yip et al., High-Performance Robotic Muscles from Conductive Nylon Sewing Thread, 2015 IEEE International Conference on Robotics and Automation (ICRA), May 26-30, 2015, 6 pages, Seattle, Washington.
Zubrycki et al., Novel haptic glove-based interface using jamming principle, Proceedings of the $10^{th}$ International Workshop on Robot Motion and Control, Jul. 6-8, 2015, 6 pages, IEEE, Poland.
David et al., Study of an External Passive Shock-absorbing Mechanism for Walking Robots, $8^{th}$ IEEE International Conference on Humanoid Robots, Dec. 1-3, 2008, pp. 435-440, Institute of Electrical and Electronics Engineers, Piscataway, New Jersey.
Kaslin et al., Towards a Passive Adaptive Planar Foot with Ground Orientation and Contact Force Sensing for Legged Robots, IEEE International Conference on Intelligent Robots and Systems, Oct. 1-5, 2018, pp. 2707-2714, Institute of Electrical and Electronics Engineers, Piscataway, New Jersey.
Liu et al., Cat-inspired Mechanical Design of Self-Adaptive Toes for a Legged Robot, IEEE International Conference on Intelligent Robots and Systems, Oct. 9-14, 2016, pp. 2425-2430, Institute of Electrical and Electronics Engineers, Piscataway, New Jersey.
Liu et al., Concept and Design of a Lightweight Biped Robot for Walking on Rough Terrain, IEEE International Conference on Robotics and Biomimetics, 2017, 6 pages, Institute of Electrical and Electronics Engineers, Piscataway, New Jersey.
Invitation to Pay Additional Fees for International Application No. PCT/US2022/044922 dated Jan. 31, 2023, 23 pages.
International Search Report for International Application No. PCT/US2022/044924 dated Feb. 6, 2023, 16 pages.

\* cited by examiner

US 11,679,511 B2

ROBOTIC END EFFECTOR WITH DORSALLY SUPPORTED ACTUATION MECHANISM

RELATED APPLICATION

This is a continuation application of U.S. application Ser. No. 16/237,609, filed Dec. 31, 2018, entitled "Robotic End Effector with Dorsally Supported Actuation Mechanism", which is incorporated by reference in its entirety herein.

BACKGROUND

Robotic hands or grippers typically require numerous degrees of freedom and elaborate control methodologies to compete with the versatility and effectiveness of the human hand. Robotic hands have been developed to generate high grasping forces by providing remote actuation. Independent actuation of every finger joint can lead to designs that are bulky, fragile and complicated. The development of robotic hands or grippers is an ongoing endeavor.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 1b is a rear perspective view of the robotic end-effector of FIG. 1a.

FIG. 2a is a side view of the robotic end-effector of FIG. 1a.

FIG. 2b is an opposite side view of the robotic end-effector of FIG. 1a.

FIG. 3 is a front view of the robotic end-effector of FIG. 1a.

FIG. 4 is a top or dorsal view of the robotic end-effector of FIG. 1a.

FIG. 5 is a bottom or palmar view of the robotic end-effector of FIG. 1a.

FIG. 6 is an end view of the robotic end-effector of FIG. 1a.

FIG. 8 is a side view of the index finger and associated dorsal actuator of the robotic end-effector of FIG. 1a.

Figure 1A:
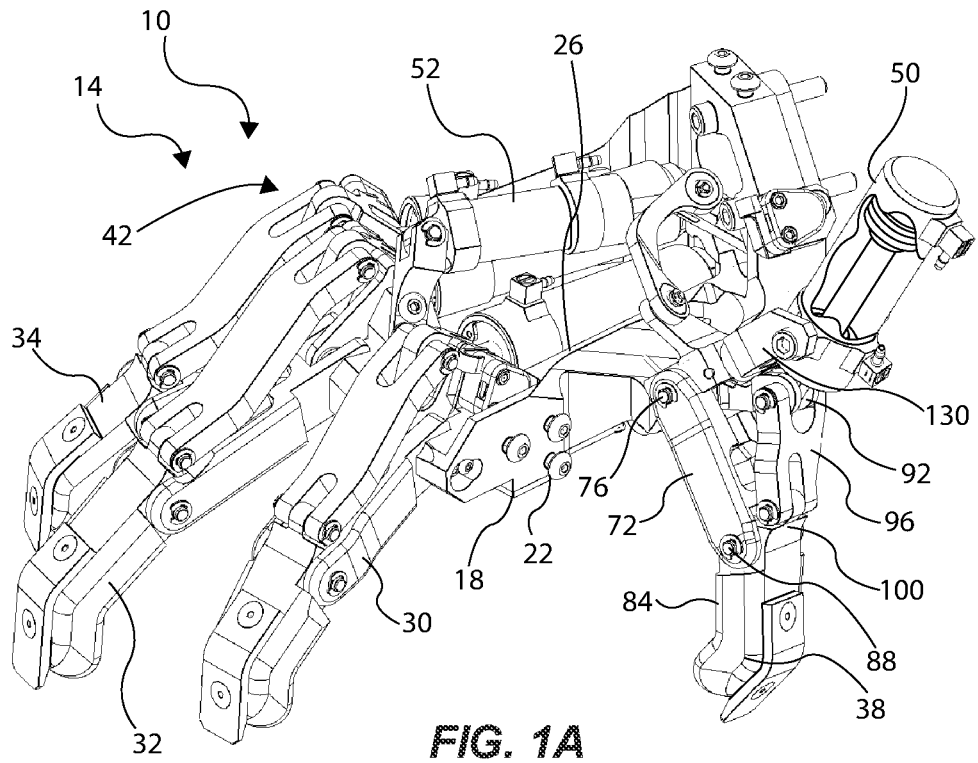
FIG. 1a is a front perspective view of a robotic end-effector, namely a semi-anthropomorphic hand, with a dorsal actuation system in accordance with an example.

Actuators of the dorsal actuation system in FIGS. 1a-11 are shown in transparency.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, "planar" refers to being substantially planar although the planar item can have a relatively small degree of curvature because it is more planar than curved. For example, a palm can be described as planar even though it has a concave curvature, and the palm is more planar than curved. In addition, "straight" refers to being substantially straight although the item may be slightly curved, because the item is more straight than curved. For example, a finger in extension is straight relative to the curvature of the finger in flexion. In addition, "parallel" refers to being substantially planar although there may be a small angular deviation from perfectly parallel because it is more parallel than perpendicular or orthogonal. For example, the fingers of a hand can be substantially parallel with the palm when the fingers are in extension even though the fingers can be somewhat arcuate and somewhat transvers to the palm.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Disclosed herein is a robotic end-effector with an anthropomorphic hand and a dorsal actuation system supported on a palm of the hand and positioned at a dorsal side of the palm and the fingers. The hand can be anthropomorphic or semi-anthropomorphic, with a palm, at least three fingers and a thumb. Thus, the end-effector or hand can be utilized with standard items, such as tools, or standard interfaces, such as door handles. Positioning the actuation system on the hand allows the end-effector or hand to be modular and easily coupleable to a robotic arm. In addition, positioning the actuation system on the hand allows a direct drive of the hand, or fingers and thumb, as opposed to being remote or driven by a remote drive. Furthermore, positioning the actuation system on the hand allows separate and direct actuation the fingers and thumb. In addition, the actuation system can move the fingers and the thumb in flexion from proximal to distal phalanges around an object with a wrap grasp (proximal to distal phalanges) like a natural hand. In addition, each finger and thumb can utilize a single actuator. Furthermore, the actuation system can provide a substantial grip.

In addition the end-effector or hand can utilize under-actuated fingers to provide low actuator count and a high degree of conformal grasping for simple objects and tasks, without the need for numerous degrees of freedom or elaborate control methodologies. The end-effector or hand can utilize compression multi-bar linkages and offset joint kinematics to provide high grasping forces around irregularly shaped objects with as little as one actuator per finger. In one aspect, the end-effector or hand can have three single-actuator fingers and a two-actuator thumb configured into a five degree of freedom, under-actuated hand for high-force grasping of a variety of utilitarian objects. In one aspect, degree of freedom reduction is accomplished through the use of a single actuator to drive serially-connected four-bar linkages within a multi-segment finger. This allows for grasping objects of arbitrary shape. The finger segment lengths and bell crank heights or radii can be tailored to meet the desired contact force distribution around such objects. The use of compression linkages provides a grasping force without the use of tendons and pulleys on the underside of the finger, thereby minimizing bulk on the working side of the hand and overall magnitude of actuator force (reduced actuation force leads to less reaction forces within the finger joints, compared with tendon actuation within the finger profile). The space available on the back of the hand can provide adequate space for larger actuators that "stick out" beyond the envelope of the human hand, so that large forces can be exerted without interfering with the portions of the hand that interact with objects.

The contact force distribution for extra-small or extra-large curvatures can be further tailored using application-specific drive link lengths, when necessary. In addition, the hand can utilize a set of splayed finger root joints so that large objects fit (or are captured) when the fingers are extended, and small objects fit (or are captured) when the fingers are closed. Moreover, using parallel but offset individual finger segment hinges, the hand can assume a natural grasp around long cylindrical shapes (such as hammer handles, ladder rungs, ropes and cables). The offset hinges can also allow the fingers to wrap tighter without collision between distal finger segments.

The use of passive spring elements and flexion/extension stops within each finger segment joint can provide for deterministic finger trajectories during non-contact actuation. For example, when starting to grasp an object, it is desirable to have a fully extended finger first bend at the most proximal joint. The second joint can then bend, followed by the final (most distal) joint. Likewise, when releasing an object, it is desirable to reverse this sequence. The spring stiffness within each finger joint is sized specific to the kinematically-determined torque delivery at each location (note that the magnitude of torque resistance is minimal compared to the actuation torque at full grasp). The finger segment stops further prevent over-center singularities from occurring during uni-axial segment loading (e.g., singularities caused by a push force down the length of a finger).

A two degree of freedom thumb provides an under-actuated series of finger segments using one actuator, with an additional actuator provided to rotate the thumb's base orientation (much like the human thumb). Small objects use the thumb rotated into rough alignment with the fingers, while large objects use the thumb rotated away from the fingers. Again it is observed that discarding the constraint to abide by the envelope of the human hand on the back of the thumb and palm, provides sufficient space to place high strength actuation without interfering with grasping functions.

In a similar way to the thumb, but using a passive spring instead of an actuator, an additional degree of freedom can be added to the base of the little finger (or, possibly, to other fingers) to allow more compact finger nesting when placing the open fingers inside the closed handle of some tools.

Figure 1B:
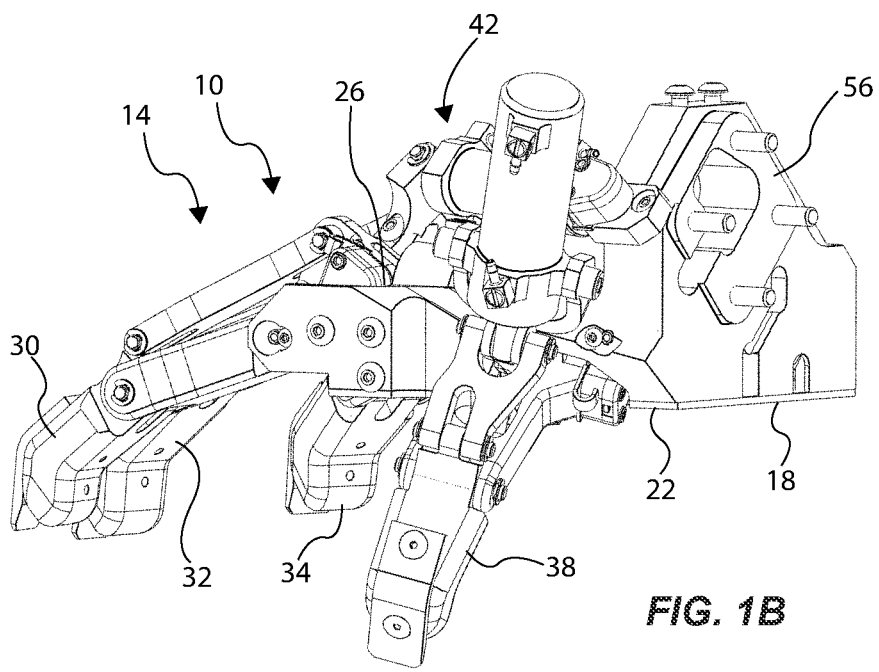

FIGS. 1a and 1b depict an exemplary end-effector 10 in accordance with an embodiment. The end-effector 10 can have or can be an anthropomorphic hand 14. The hand 14 has a palm 18 with a palmar or ventral side 22 and a dorsal side 26. The palm 18 or the palmar side 22 can be flat or planar, as shown. In another aspect, the palm 18 or the palmar side 22 can have a slight curvature or concavity, but is more flat or planar than curved or concave, as with a natural human palm. The palm 18 can have a thickness between the palmar and dorsal sides 22 and 26. In one aspect, the palm 18 can be or can have a frame with an interior space or hollow(s). In one aspect, the palm 18 can be formed of plastic, and can be formed by injection molding or 3D printing. In another aspect, the palm 18 can be formed of metal, and can be formed by machining or casting.

In addition, the end-effector 10 and the hand 14 have at least three fingers 30, 32 and 34, including for example, a first or index finger 30, a second or middle finger 32, and a third, ring or pinky finger 34. The fingers 30, 32 and 34 are pivotally coupled to the palm 18. The fingers 30, 32 and 34 pivot between extension (straight and/or away from the palm 18) and flexion (curved and/or towards the palm 18), or an extended position and a flexed position. In extension, the fingers 30, 32 and 34 can extend away from the palm 18 or the palmar side 22. In flexion, the fingers 30, 32 and 34 can be arcuate, and can be positioned so as to oppose the palmar side 22 of the palm 18. The fingers 30, 32 and 34 will be discussed in greater detail below with respect to finger 30 and FIGS. 7 and 8. The terms "flexion" or "flex" and "extend" or "extension" as used herein are intended to comprise the same or a similar meaning as understood by those skilled in the art as they pertain to the human hand.

In addition, the end-effector 10 and the hand 14 has a thumb 38 pivotally coupled to the palm 18. The thumb 38 can pivot between abduction (away from and/or opposing the fingers 30, 32 and 34) and adduction (toward and/or with the fingers 30, 32 and 34). In abduction, the thumb 38 can be transvers to the palm 18. In adduction, the thumb 38 can be straightened, such as to be planar with the palm 18. In addition, the thumb 38 can be pivotal between extension and flexion. In extension, the thumb 38 can be straightened. In flexion, the thumb 38 can be arcuate. The thumb 38 is described below in greater detail and with respect to FIGS. 9a-9c.

Figure 2A:
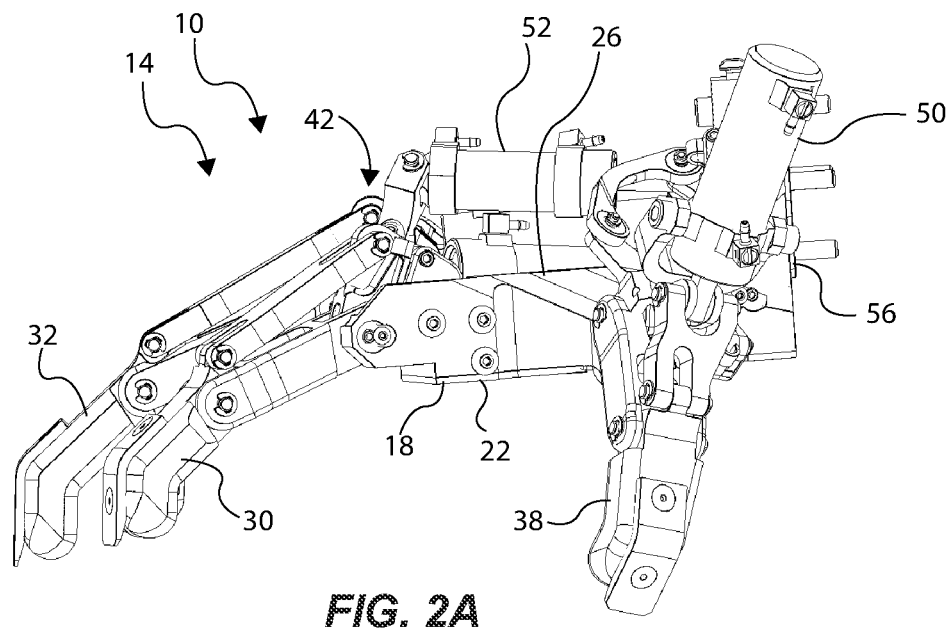
Figure 2B:
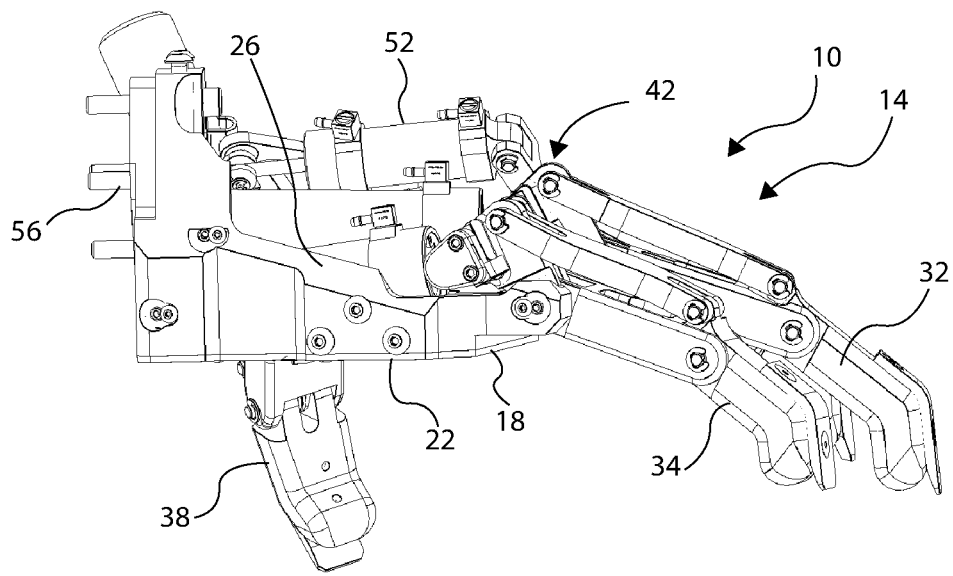

FIGS. 2a and 2b depict the fingers 30, 32 and 34 of the end-effector 10 or the hand 14 in extension. Even in extension, the fingers 30, 32 and 34, or the phalanges thereof, can have a slight curvature and angle between adjacent phalanges, while still being substantially straight. For example, in extension, adjacent phalanges can have an acute angle less than 30 degrees in one aspect, less than 25 degrees in another aspect, and less than 20 degrees in another aspect. In addition, FIGS. 2a and 2b depict the thumb 38 is in abduction, transverse with the palm, and in extension.

Figure 3:
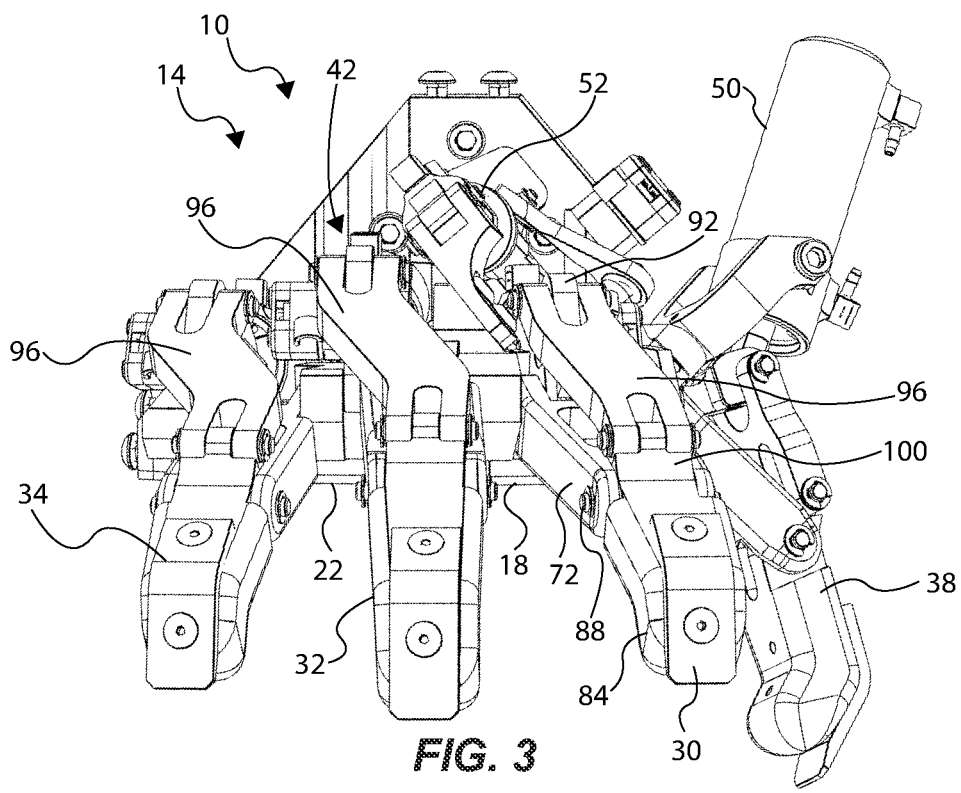
Figure 4:
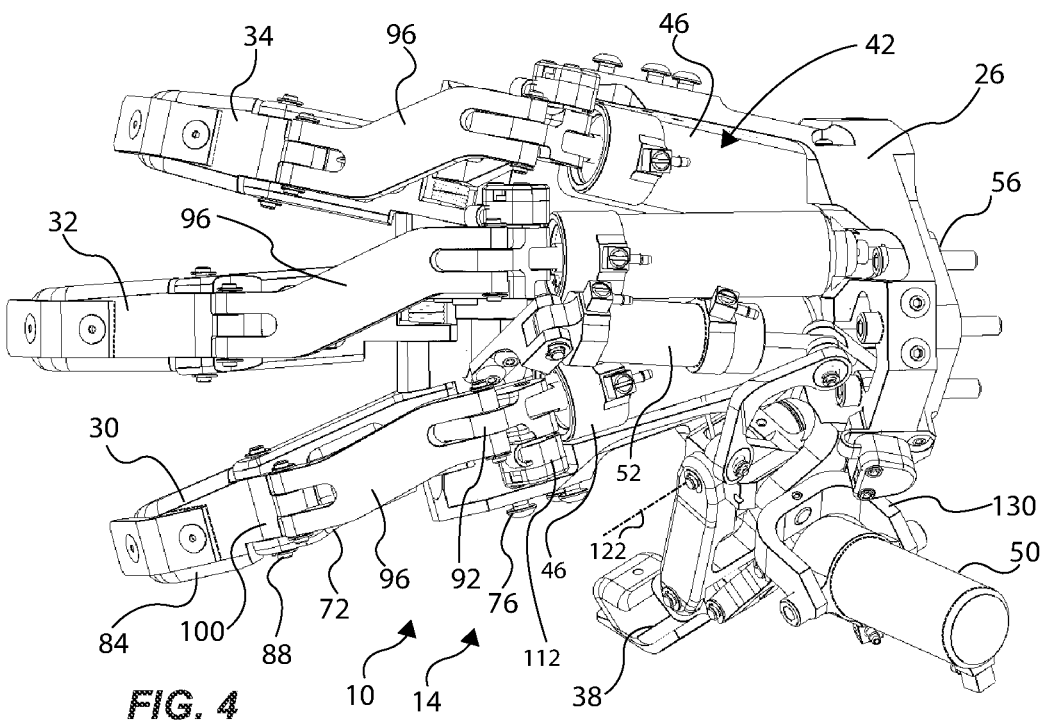

FIGS. 3 and 4 depict the fingers 30, 32 and 34 of the end-effector 10 or the hand 14 arrayed at acute angles with respect to one another. In addition, the end-effector 10 and the hand 14 has a dorsal actuation system 42 for actuating the fingers 30, 32 and 34 and the thumb 38. The actuation system 42 can be supported on the dorsal side 26 of the palm 18 or the hand 14, and the dorsal side of the fingers 30, 32 and 34 and the thumb 38. The actuation system 42 can comprise a single actuator 46 for each finger 30, 32 and 34, and a pair of actuators for the thumb 38, namely first and second actuators 50 and 52. The actuators 46, 50 and 52 can be disposed on the dorsal side 26 of the palm 18, or the back of the hand 14. In one aspect, some of the actuators 46 can be disposed in, or partially disposed in, the hand 14 or the frame of the palm 18. In another aspect, some of the actuators 50 and 52 can be disposed outside of an envelope of the hand 14, and/or disposed outside an envelope of a natural hand, and/or outside the frame of the palm 18. The actuators 46, 50 and 52 can comprise pneumatic cylinders, hydraulic cylinders, linear electric motors, rotation motors, voice coils, or the like. In addition, the actuation system 42 comprises links, bell cranks, and yokes, supported on the fingers 30, 32 and 34 and the thumb 38, as described in greater detail below and with respect to FIGS. 7-9c.

The hand 14 or the palm 18 can have a thickness and can comprise a frame as mentioned above. The frame can have a skeleton with interior cavities or hollows to receive all or part of the actuators 46. In addition, the palm 18 or the palmar side 22 thereof can have a plate coupled to the frame to close the interior cavities or hollows with respect to the palmar side 22. In one aspect, the actuators 46 can be disposed in the thickness of the palm 18 to protect the actuators 46. In another aspect, the actuators 46 can extend beyond a thickness of the palm 18 and outside an envelope of a natural hand to facilitate actuation of the fingers 30, 32 and 34.

Figure 5:
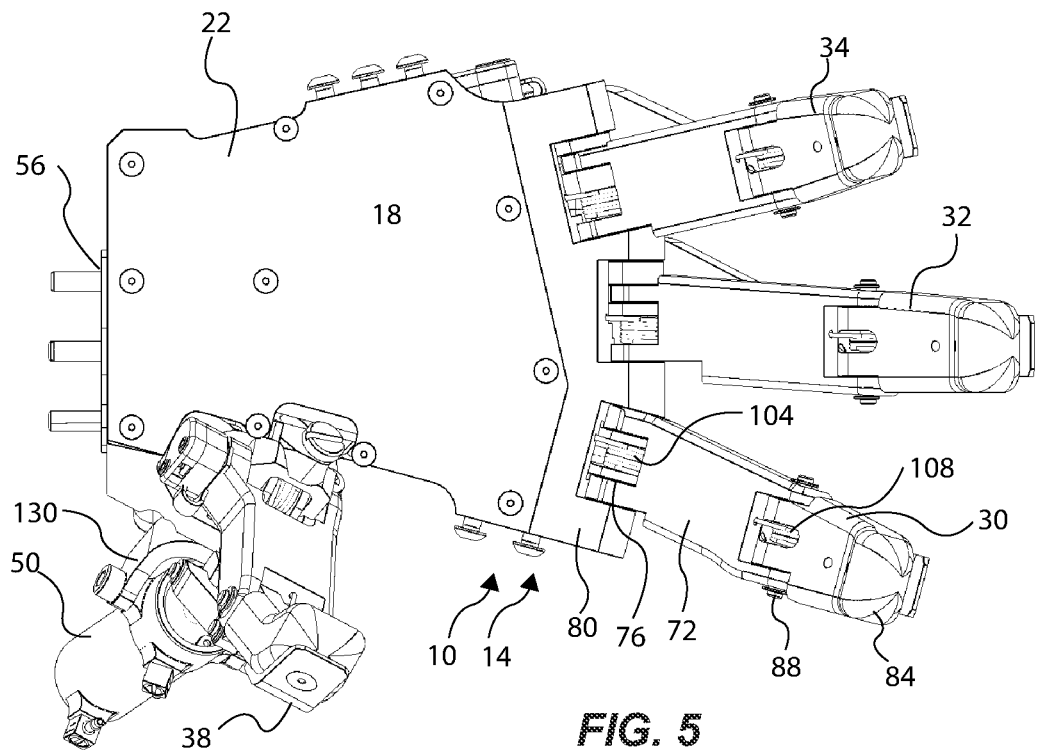
Figure 6:
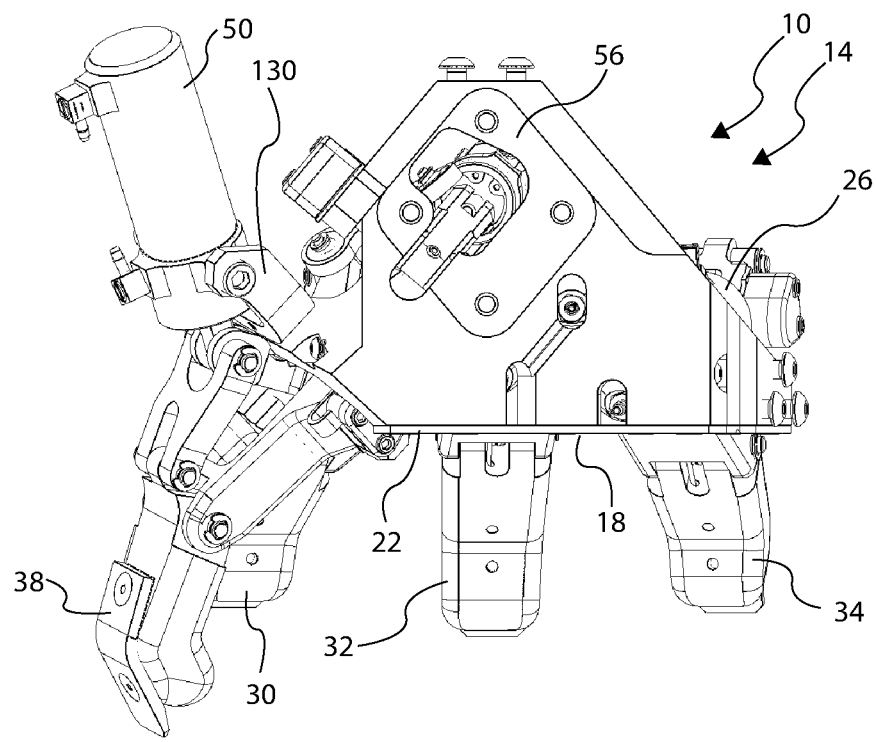

FIGS. 5 and 6 (and FIG. 1b) depict the end-effector 10 or the hand 14 with a releasable end-effector to robotic arm attachment interface 56 (hereinafter releasable attachment interface 56) at a proximal end (i.e., that end of the end-effector opposite the fingers and the end designed, configured and intended to couple to a robotic arm) of the palm 18 of the hand 14 of the end-effector 10. The releasable attachment interface 56 can releasably attach the robotic end-effector 10 or the hand 14 to a robotic arm (not shown). Because the dorsal actuation system 42 is supported on the dorsal side 26 of the hand 14 or the palm 18, in some examples the releasable attachment interface 56 can connect to a robotic arm without an actuator or actuator link, such as cables, rods or belts, spanning across the attachment interface. However, other examples may utilize or be operable with an actuator in connection with a wrist-like joint between the end-effector 10 and the robotic arm. In addition, the end-effector 10 or the hand 14 with the releasable attachment interface 56 can define a modular robotic end-effector that can be more easily attached, removed, and/or swapped with respect to the robotic arm. Flexible lines associated with the actuators, such as pneumatic hoses, hydraulic hoses, power cords, sensor wires, etc., can extend across the attachment interface; but such flexible lines are more easily coupled and uncoupled than actuator links, such as tensioned cables, rods and belts. Thus, in one aspect, all actuation of the at least three fingers 30, 32 and 34 and the thumb 38 can be supported on the robotic end-effector 10 or the hand 14, including all actuators and all links coupled to the at least three fingers 30, 32 and 34 and the thumb 38. In one example, the releasable attachment interface 56 can comprise mating stubs extending from the proximal end of the palm 18 of the hand 14 of the end-effector 10 that can align and mate with corresponding notches in the robotic arm, or vice versa. Of course, this is just one example. Those skilled in the art will recognize a variety of other ways the connecting or attachment interface between the robotic end-effector 10 and a corresponding robotic arm could be designed, and the individual mating end-effector 10 and robotic arm configured to provide the desired interface.

Figure 7:
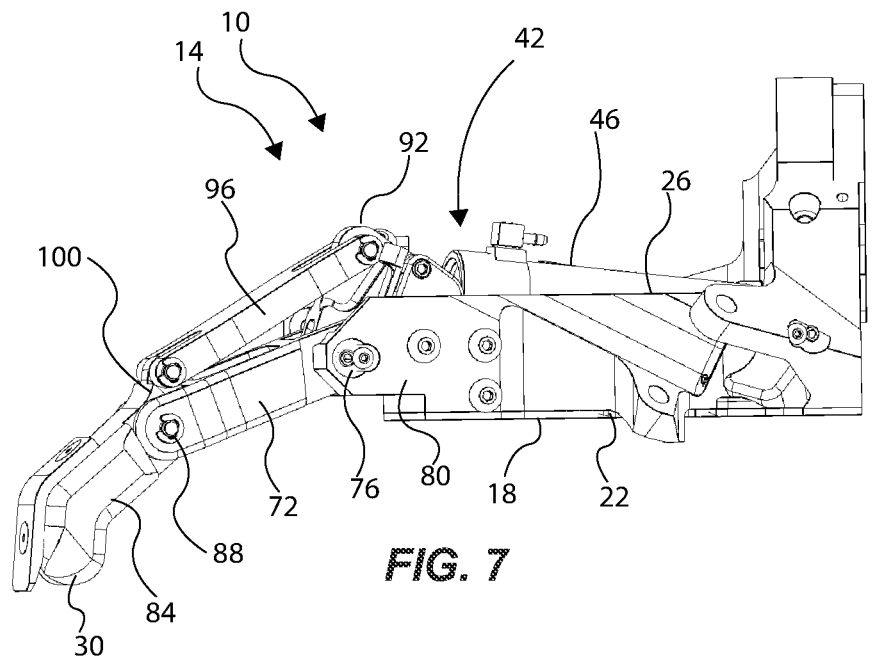
FIG. 7 is a side view of the robotic end-effector of FIG. 1a, shown with the other fingers and thumb removed to show a single finger, namely an index finger.
Figure 8:
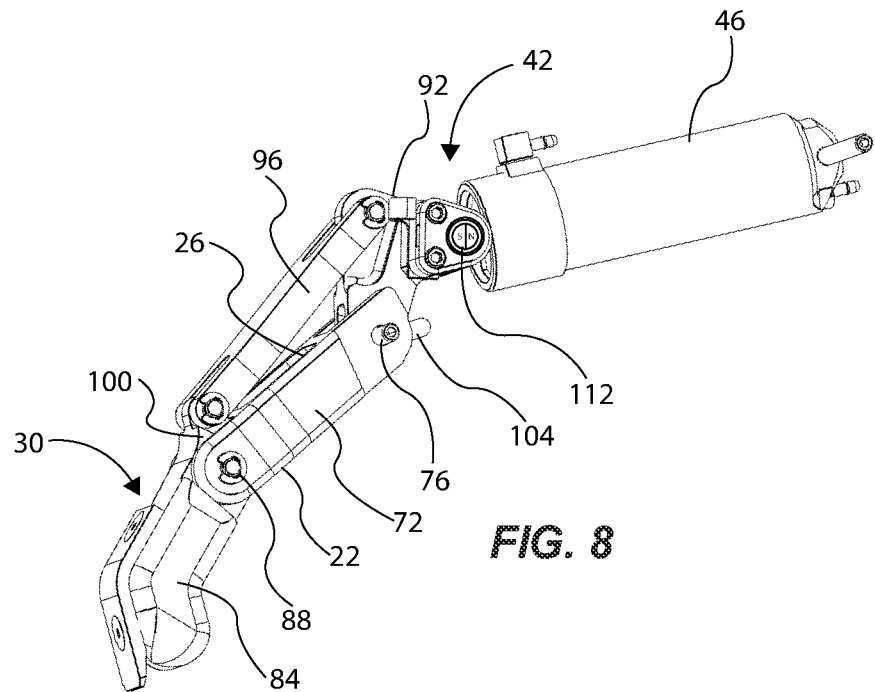

FIGS. 7 and 8 depict an exemplary finger 30 of the hand 14 or the end-effector 10; and will be utilized to describe the other fingers 32 and 34, and even the thumb 38, with the understanding that a description of finger 30 applies to the other fingers 32 and 34, and the thumb 38, as well. In addition, FIGS. 7 and 8 depict the dorsal actuation system 42; and will be utilized to describe the actuation system 42 for the other fingers 32 and 34, and even the thumb 38, with the understanding that a description of the dorsal actuation system 42 for the finger 30 applies to the other fingers 32 and 34, and the thumb 38, as well, FIG. 7 depicts the finger 30 pivotally coupled to the palm 18 of the hand 14, with the other fingers, the thumb, and the other actuators removed for clarity. The finger 30 is shown in extension with respect to the palmar side 22 of the palm 18. FIG. 8 depicts the finger 30 along with the actuation system 42, but with the palm, the other fingers, and the thumb removed for clarity.

The finger 30 comprises phalanges pivotally coupled together in series. In one aspect, the finger 30 comprises at least two phalanges. In another aspect, the finger can comprise three phalanges, as shown in FIGS. 12a-14. The finger 30 comprises a proximal phalanx 72 pivotally coupled to the palm 18 at a metacarpo-phalangeal joint or pivot 76. The palm 18 can have a yoke 80 (FIGS. 5 and 7) in which the proximal phalanx 72 can be pivotally coupled, and which can carry a pivot axle of the metacarpo-phalangeal joint 76. The finger 30 also comprises a distal phalanx 84 pivotal with respect to the proximal phalanx 72 and pivotal about a distal joint or pivot 88. In one aspect, the distal phalanx 84 can be pivotally coupled to the proximal phalanx 72, as shown. In another aspect, the finger can have an intermediate phalanx coupled between the proximal and distal phalanges, as shown in FIGS. 12a-14. As with the palm 18, the finger 30 has a ventral side and a dorsal side, also represented by 22 and 26, respectively. The finger 30, or the proximal and distal phalanges 72 and 84 thereof, can be formed of plastic, and can be formed by injection molding or 3D printing. In another aspect, the finger 30, or the proximal and distal phalanges 72 and 84 thereof, can be formed of metal, and can be formed by machining or casting.

As indicated above, the dorsal actuation system 42 also comprises links and bell cranks, and even a yoke for the thumb 38, in addition to the actuator 46. As described above, the actuation system 42 comprises the actuator 46 supported on the palm 18, and positioned on the dorsal side 26 of the palm 18. The actuation system 42 also comprises a proximal bell crank 92 pivotally coupled to the palm 18 along with the proximal phalanx 72 at the metacarpo-phalangeal joint 76. Thus, the proximal bell crank 92 pivots about the metacarpo-phalangeal joint 76 along with the proximal phalanx 72. A proximal dorsal link 96 is pivotally coupled between the proximal bell crank 92 and the distal phalanx 84. In one aspect, the distal phalanx 84 has a protrusion or tab 100 extending therefrom at the distal joint 88. The proximal dorsal link 96 can be pivotally coupled to the distal phalanx 84 or the protrusion 100 thereof, as shown. In addition, the proximal dorsal link 96 can be positioned at the dorsal side 26 of the proximal phalanx 72. In operation, the actuator 46 extends the proximal bell crank 92 and the proximal dorsal link 96 to pivot the proximal and distal phalanges 72 and 84 in flexion, or in the flexion direction to oppose the palmar side 22 of the palm 18. In one aspect, the actuator 46 can retract to pivot the proximal and distal phalanges 72 and 84 in extension. In one aspect, the actuator 46 can be oriented parallel or transverse with the palmar or dorsal side 22 or 26 of the palm 18. In addition, the actuator 46 can be disposed on or over the dorsal side 26 of the palm 18. Furthermore, the actuator 46 can be disposed at least partially within a frame of the palm 18.

In another aspect, the proximal and distal phalanges 72 and 84 can be biased in extension, or can be retracted to extension by springs. The actuation system 42 can comprise a metacarpo-phalangeal spring 104 (FIGS. 5 and 8) coupled to the metacarpo-phalangeal joint 76 to bias the proximal phalanx 72 in extension. Similarly, the actuation system 42 can also comprise a distal spring 108 (see FIG. 5) coupled to the distal joint 88 to bias the distal phalanx 84 in extension. The springs 104 and 108 can be coil springs circumscribing axles of the joints 76 and 88, respectively.

The lengths or the phalanges 72 and 84 and the height or radius of the bell crank 92 can be tailored to meet the desired contact force distribution around an object. The proximal bell crank 92 and/or the proximal dorsal link 96 can be formed of plastic, and can be formed by injection molding or 3D printing. In another aspect, the proximal bell crank 92 and/or the proximal dorsal link 96 can be formed of metal, and can be formed by machining or casting.

In addition, one or more sensors can be positioned on the finger 30 and/or the actuator system 42 to determine a position and/or a force exerted by the finger 30 or the actuator 46. For example, a sensor 112 (FIG. 8) can be positioned at a pivot link between the bell crank 92 and the actuator 46.

Referring again to FIGS. 3 and 4, the proximal dorsal links 96 and the actuators 46 of the actuation systems 42 of the fingers 30, 32 and 34 can be parallel with the fingers, but off-set, to accommodate placement of the actuators 46 on the hand 14 or the dorsal side 26 of the palm 18.

Figure 9A:
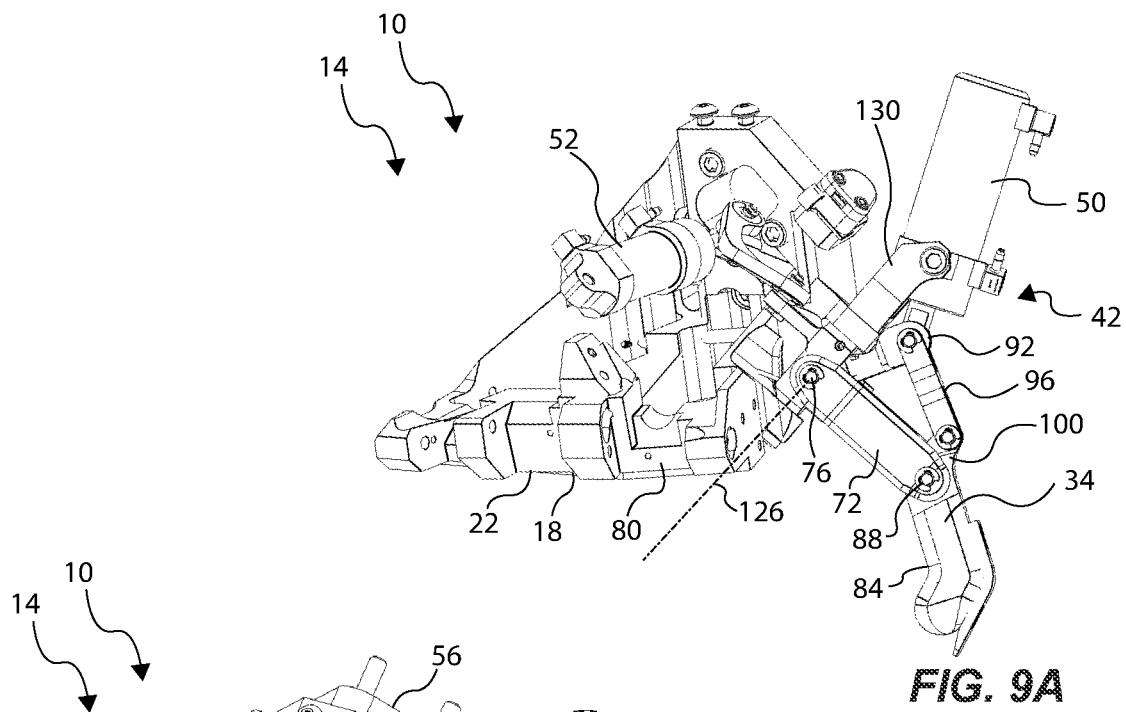
FIGS. 9a-c are perspective views of the robotic end-effector of FIG. 1a, shown with the fingers and associated dorsal actuators removed to show the thumb.
Figure 9B:
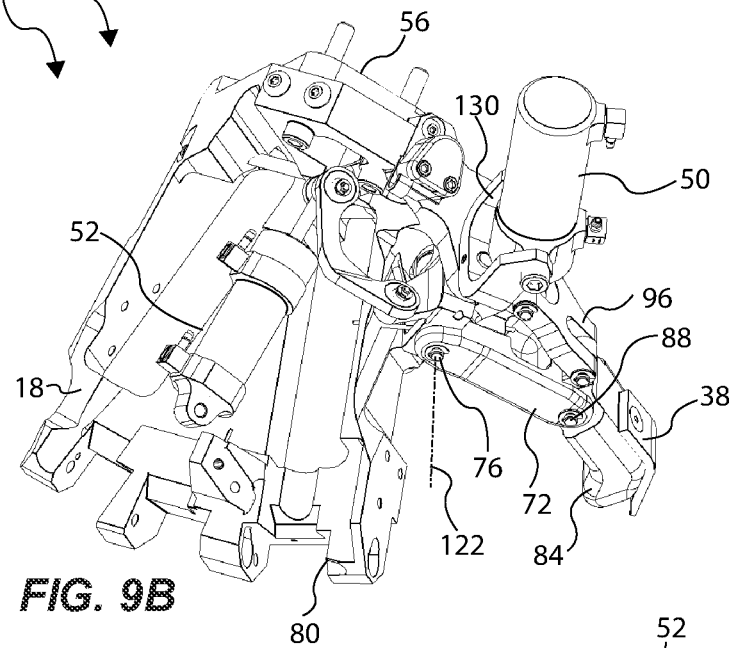
Figure 9C:
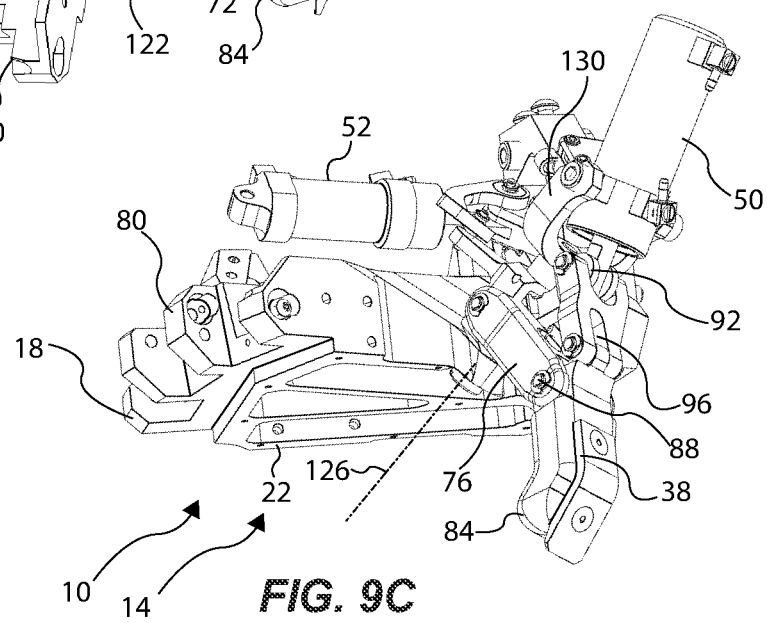

FIGS. 9a-9c depict the thumb 38 of the hand 14 or the end-effector 10. In addition, FIGS. 9a-9c depict the dorsal actuation system of the thumb 38. FIGS. 9a-9c depict the thumb 38 pivotally coupled to the palm 18 of the hand 14, with the other fingers and the other actuators removed for clarity. It is understood that the description of the finger 30 and the actuation system 42 applies equally to the thumb 38. As such, the thumb 38 can have a proximal phalanx 72 pivotally coupled to the palm 18 at a metacarpophalangeal joint 76, and a distal phalanx 84 pivotal with respect to the proximal phalanx 72 about a distal joint 88. In addition, the actuation system 42 can have an actuator 50, a proximal bell crank 92, a proximal dorsal link 96, and a protrusion 100.

In addition to pivoting between extension and flexion, as do the fingers, the thumb 38 can also be movable or pivotal between retroposition (substantially planar or parallel with the palmar side 22 of the palm 18) and anteposition (opposing the palmar side 22 of the palm 18). Thus, the proximal phalanx 72 of the thumb 38 can have a pair of pivots with respect to the palm 18, including a first axis or pivot 122 (FIG. 9b) in which the thumb 38 pivots in flexion/extension, and a second axis or pivot 126 (FIGS. 9a and 9c) in which the proximal phalanx 72 of the thumb 38 pivots in abduction/adduction. The first and second pivots axes 122 and 126 can be transverse to one another and can intersect. The dorsal actuation system 42 of the thumb 38 can comprise a pair of actuators, namely a first actuator 50 to pivot the thumb 38 in flexion/extension about the first axis 122, and a second actuator 52 to pivot the thumb 38 in abduction/adduction about the second axis 126.

The thumb 38 can have a yoke 130 pivotally coupled to the palm 18. The yoke 130 can have a shaft or neck that pivots about the second axis 126. The second actuator 52 can be supported on the dorsal side 26 of the palm 18 and coupled to the yoke 130 to pivot the yoke about the second axis 126. The proximal and distal phalanges 72 and 84 of the thumb 38 can be supported on the yoke 130 with the proximal phalanx 72 of the thumb 38 pivotally coupled to the yoke 130. The first actuator 50 can be supported on the yoke 130 and coupled to the proximal phalanx 72 of the thumb 38. In operation, the second actuator 52 pivots the yoke 130, the proximal and distal phalanges 72 and 84 of the thumb 38, and the first actuator 50, about the second axis 126 in an abduction/adduction direction between retroposition and anteposition, while the first actuator 50 pivots the proximal and distal phalanges 72 and 84 of the thumb 38 about the first axis 122 in extension/flexion.

The actuators 46, 50 and 52, or portions thereof, can be disposed outside of the palm 18, or envelope of a natural human hand. Thus, the actuators 46, 50 and 52 can be positioned as desired or to maximize finger movement or force.

Figure 10:
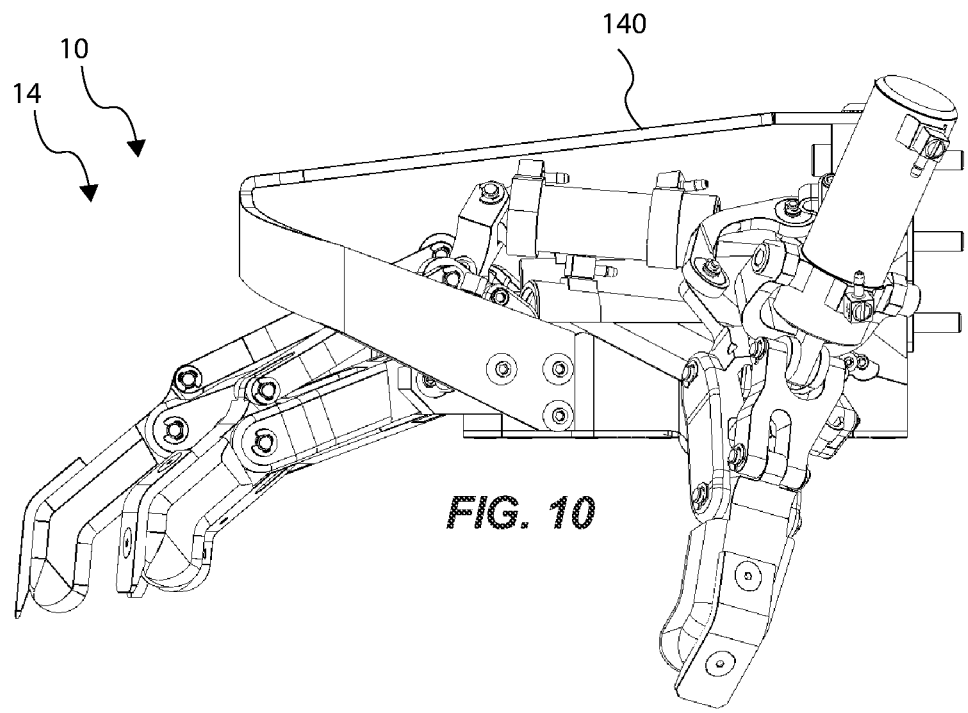
FIG. 10 is a side view of the robotic end-effector of FIG. 1a, shown with a guard over the dorsal actuation system.
Figure 11:
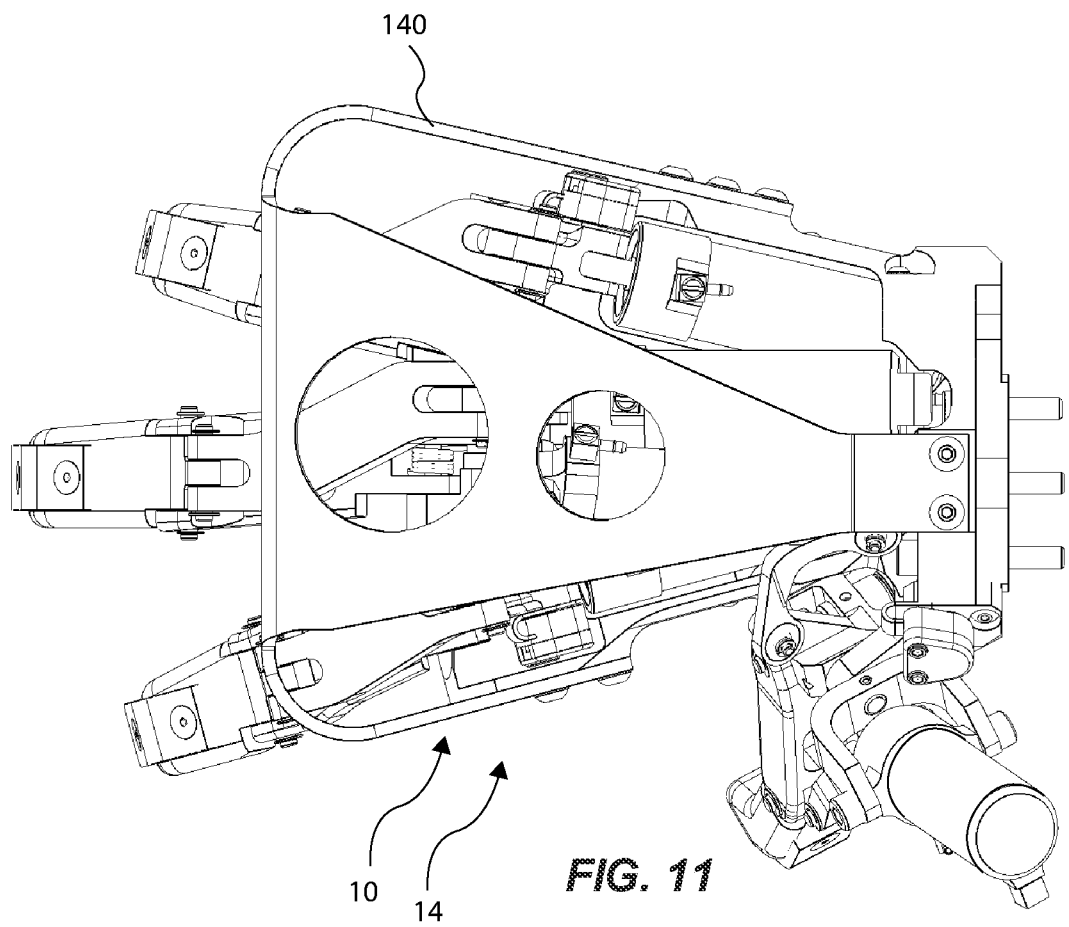
FIG. 11 is a tope view of robotic end-effector of FIG. 1a, shown with the guard over the dorsal actuation system.

FIGS. 10 and 11 depict the end-effector 10 and the hand 14 with a guard 140 disposed over the dorsal side 26 of the palm 18, and over the actuators 46 and 50 to protect the actuators. The guard 140 is illustrated as transparent.

Figure 12A:
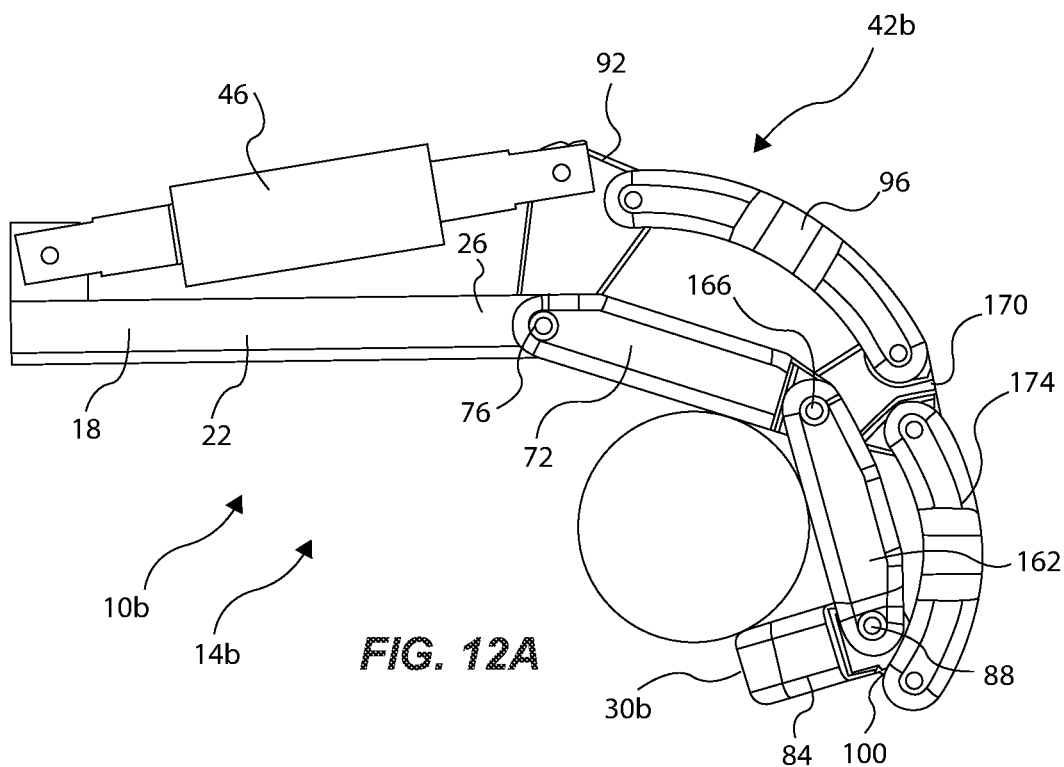
FIG. 12a is a schematic side view of a robotic end-effector in accordance with an example, showing the fingers in partial flexion about an object.
Figure 12B:
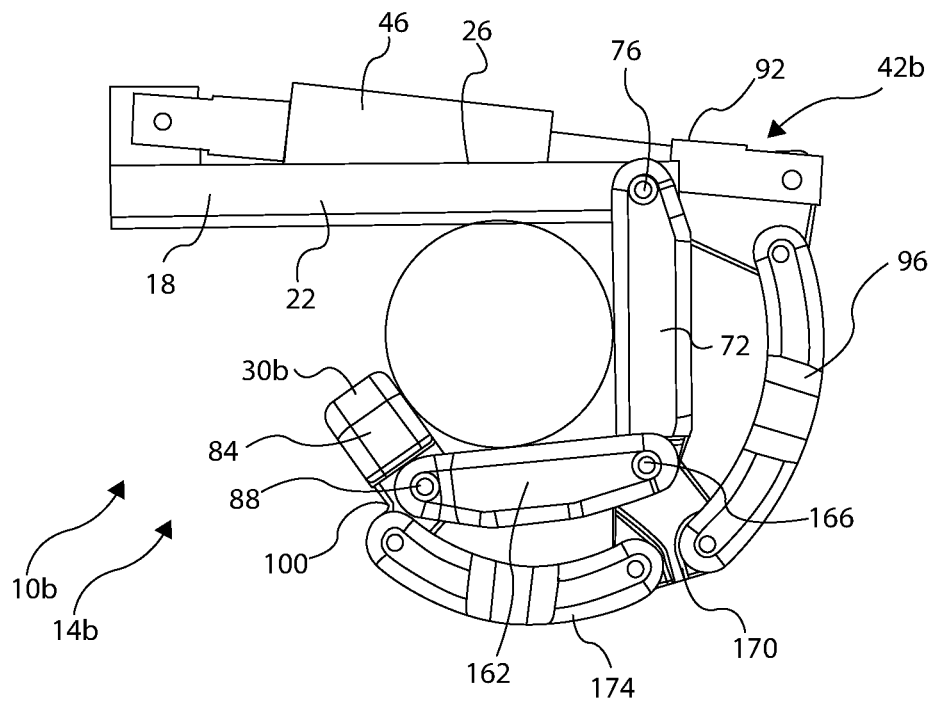
FIG. 12b is a schematic side view of the robotic end-effector of FIG. 12a, showing the fingers in flexion about the object.

FIGS. 12a and 12b schematically depict an end-effector 10b and a hand 14b which are similar in most respects to that described above, and which description is hereby incorporated herein where applicable, as will be recognized by those skilled in the art. The finger 30b comprises three phalanges coupled together in sequence. The finger 30b further comprises a middle phalanx 162 pivotally coupled to the proximal phalanx 72 at a proximal joint or pivot 166 and to the distal phalanx 84 at the distal joint 88. The dorsal actuation system 42b comprises a middle bell crank 170 pivotally coupled to the proximal phalanx 72 at the proximal joint 166 along with the distal phalanx 84. In addition, a middle link 174 is pivotally coupled to and between the middle bell crank 170 and the distal phalanx 84. The middle link 174 is positioned at the dorsal side 26 of the middle phalanx 162.

Each finger 30b and actuation system 42b can form a series of serially-connected four-bar linkages. A proximal four-bar linkage can be formed by the proximal phalanx 72, the proximal bell crank 92, the proximal dorsal link 96, and the middle bell crank 170. Similarly, a distal four-bar linkage can be formed by the middle phalanx 162, the middle bell crank 170, the middle link 174, and the distal phalanx 162, or the protrusion 100 thereof.

In one aspect, the fingers and the actuation system of the end-effector 10b and a hand 14b can be sized as shown in Table 1.

TABLE 1

|  | Index | Middle | Ring | Thumb |
|---|---|---|---|---|
| Phalanx Length (in.) | | | | |
| Proximal Phalanx | 1.576 | 1.995 | 1.460 | 1.487 |
| Middle Phalanx | 0.974 | 1.233 | 0.902 | 0.919 |
| Distal Phalanx | 0.602 | 0.762 | 0.558 | 0.568 |
| Bell Crank Radius (in.) | | | | |
| Proximal Bell Crank | 1.000 | 1.000 | 1.000 | 1.000 |
| Middle Bell Crank | 0.500 | 0.500 | 0.500 | 0.500 |
| Protrusion | 0.191 | 0.191 | 0.191 | 0.191 |

Figure 13A:
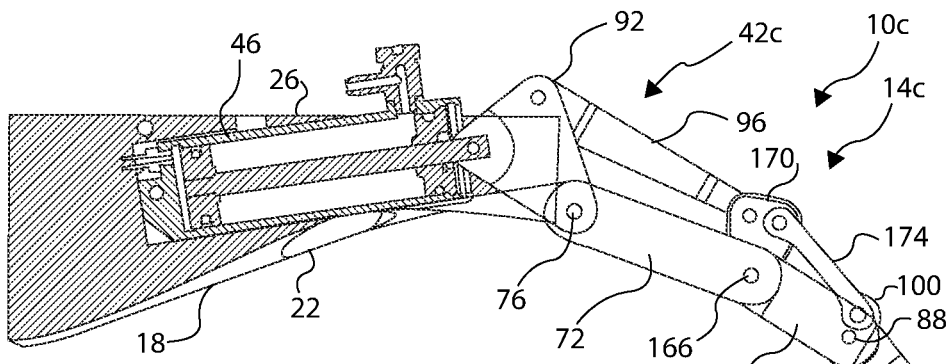
FIG. 13a is a schematic side view of the robotic end-effector in accordance with an example, showing the fingers in extension.
Figure 13B:
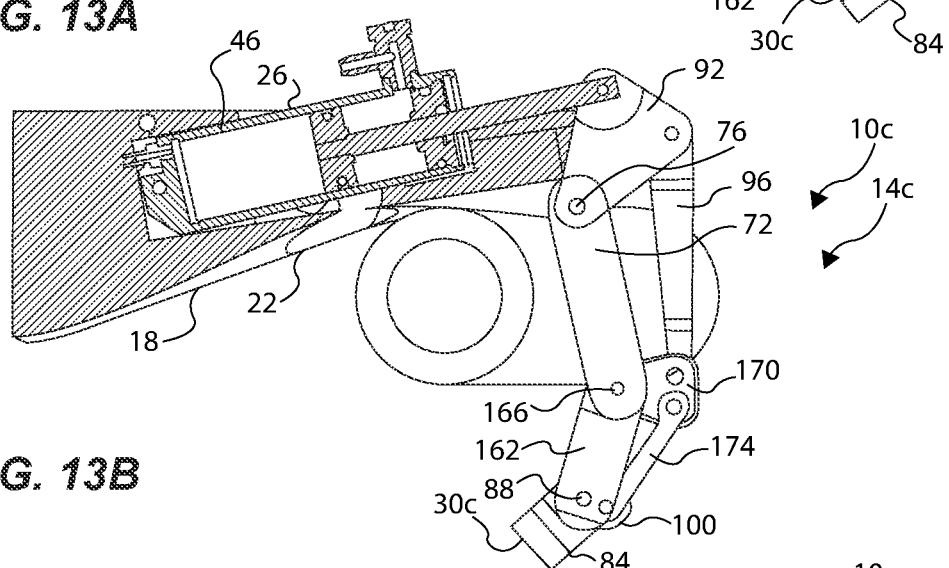
FIG. 13b is a schematic side view of the robotic end-effector of FIG. 13a, showing the fingers in partial flexion about an object.
Figure 13C:
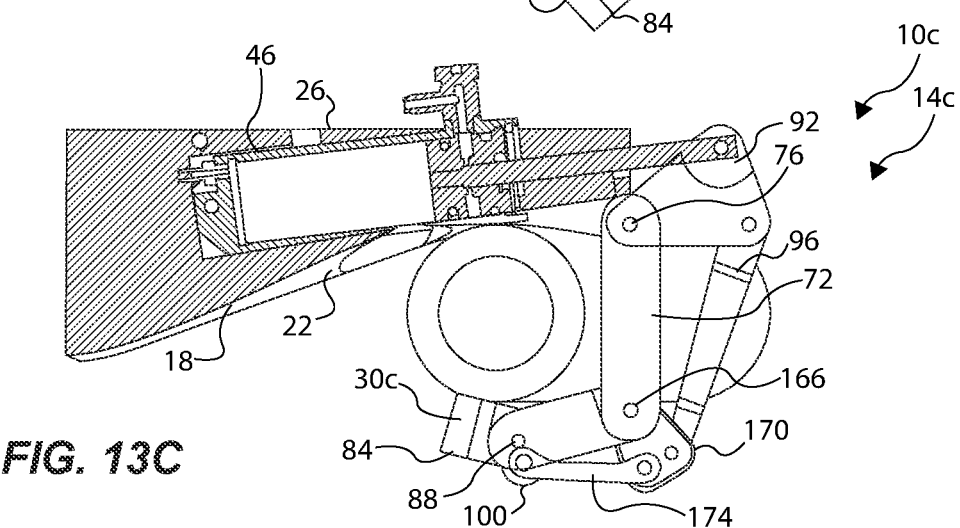
FIG. 13c is a schematic side view of the robotic end-effector of FIG. 13a, showing the fingers in flexion about an object.

FIGS. 13a-13c schematically depict an end-effector 10c and a hand 14c which are similar in most respects to those described above, and which description is hereby incorporated herein where applicable, as will be recognized by those skilled in the art. FIGS. 13a-13c schematically depict the end-effector 10c and the hand 14c in operation moving between extension of the finger 30c in FIG. 13a and flexion of the finger 30c in FIG. 13c. In addition, FIGS. 13a-13c demonstrate a wrap grasp of the finger 30c and the actuation system 42c in which the phalanges and associated links pivot and contact a grasped object in sequential order beginning with the proximal phalanx 72, then the middle phalanx 162, and then the distal phalanx 84; or the proximal phalanx 72 then the distal phalanx 84 in the case of two phalanges. Furthermore, the palm 18 or the palmar side 22 can have a slight curvature or concavity, but is more flat or planar than curved or concave, as with a natural human palm.

Figure 14:
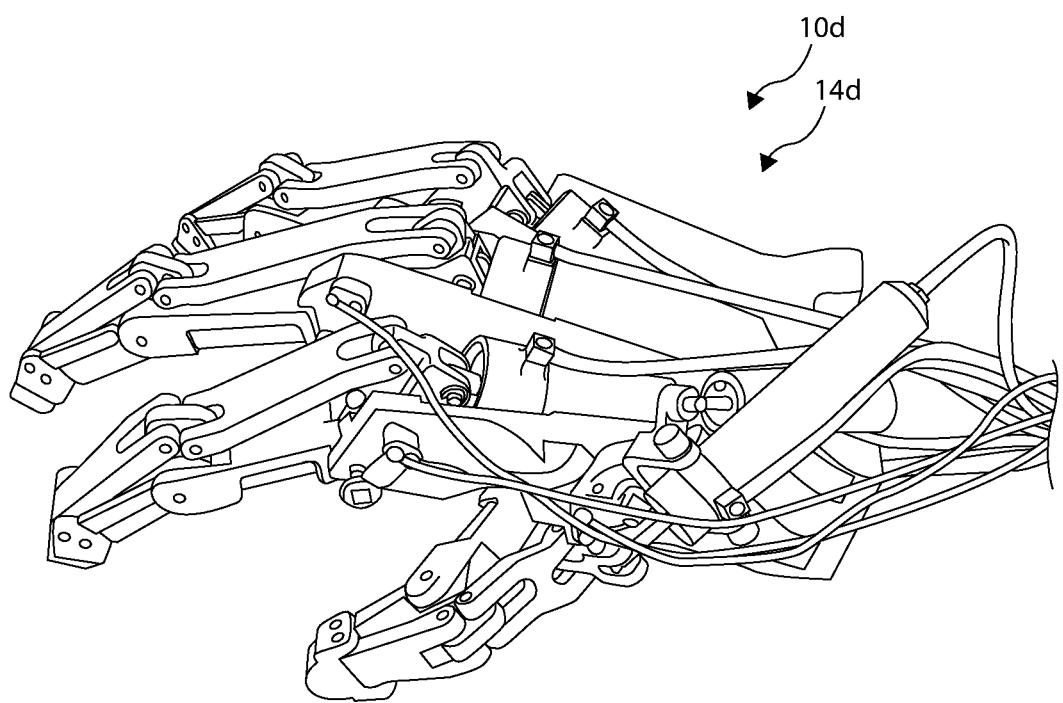
FIG. 14 is a perspective view photograph of a robotic end-effector, namely a semi-anthropomorphic hand, with a dorsal actuation system in accordance with an example.

FIG. 14 is a photograph of an end-effector 10d and a hand 14d which are similar in most respects to those described above, and which description is hereby incorporated herein where applicable, as will be recognized by those skilled in the art.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A robotic end-effector, comprising:
an anthropomorphic hand comprising:
a palm with a palmar side and a dorsal side;
fingers pivotally coupled to the palm and pivotal between extension and flexion; and
a thumb pivotally coupled to the palm and pivotal between abduction and adduction, and also pivotal between extension and flexion, each of the fingers and the thumb comprising phalanges comprising at least:
a proximal phalanx pivotally coupled to the palm at a metacarpo-phalangeal joint;
a distal phalanx pivotal with respect to the proximal phalanx about a distal joint; and
a ventral side and a dorsal side; and
a dorsal actuation system for actuating the fingers and the thumb, the dorsal actuation system being supported on the dorsal side of the palm and the dorsal sides of the fingers and the thumb, the dorsal actuation system comprising:
actuators associated with each of the fingers and the thumb, respectively, each actuator being supported on the palm;
proximal bell cranks associated with each of the fingers and the thumb, respectively, each proximal bell crank being pivotally coupled to the palm along with the proximal phalanx of each of the fingers and the thumb, respectively; and
proximal dorsal links associated with each of the fingers and the thumb, respectively, each proximal dorsal link being pivotally coupled between the proximal bell crank and the distal phalanx of each finger and the thumb, respectively, and positioned at the dorsal side of the proximal phalanx of each finger and the thumb, respectively,
wherein the actuators are operable to extend the proximal bell cranks and the proximal dorsal links to pivot the proximal and distal phalanges in flexion, and
wherein the actuators associated with each of the fingers are positioned on the dorsal side of the palm to be parallel with a corresponding finger but offset from the corresponding finger.

2. The robotic end-effector of claim 1, wherein all actuation components of the fingers and the thumb are supported on the robotic end-effector including all actuators and all links coupled to the fingers and the thumb.

3. The robotic end-effector of claim 1, further comprising a releasable attachment interface at a proximal end of the palm configured to releasably attach the robotic end-effector to a robotic arm, without an actuator or actuator link spanning across the releasable attachment interface, and defining a modular robotic end-effector.

4. The robotic end-effector of claim 1, wherein the proximal phalanx of the thumb has a pair of pivots with respect to the palm including a first pivot in which the thumb is operable to pivot in abduction/adduction and a second pivot in which the proximal phalanx of the thumb is operable to pivot in flexion/extension.

5. The robotic end-effector of claim 1, wherein thumb is movable between retroposition and anteposition.

6. The robotic end-effector of claim 1, wherein the actuators comprise a pair of thumb actuators associated with the thumb.

7. The robotic end-effector of claim 6, wherein
the thumb further comprises a yoke pivotally coupled to the palm, and the proximal phalanx of the thumb is pivotally coupled to the yoke;
a first thumb actuator of the pair of thumb actuators is supported on the yoke and coupled to the proximal phalanx of the thumb, the first thumb actuator being operable to pivot the proximal phalanx and the distal phalanx of the thumb about a first axis in extension/flexion; and
a second thumb actuator of the pair of thumb actuators is supported on the dorsal side of the palm and coupled to the yoke, the second thumb actuator being operable to pivot the yoke about a second axis to pivot the yoke, the proximal phalange, and the distal phalange of the thumb in an abduction/adduction direction between retroposition and anteposition.

8. The robotic end-effector of claim 1, wherein the distal phalanx of each of the fingers and the thumb comprises a respective protrusion extending therefrom at the distal joint, the proximal dorsal links of the fingers and the thumb, respectively, being pivotally coupled to the protrusions, respectively.

9. The robotic end-effector of claim 1, wherein the dorsal actuation system further comprises metacarpo-phalangeal springs associated with each of the fingers and the thumb, respectively, each metacarpo-phalangeal spring being coupled to the metacarpo-phalangeal joint and biasing the proximal phalanx of each of the fingers and the thumb, respectively, in extension, and distal springs associated with each of the fingers and the thumb, respectively, the distal springs being coupled to the distal joint and biasing the distal phalanx of each of the fingers and the thumb, respectively, in extension.

10. The robotic end-effector of claim 1, wherein each of the fingers further comprises:
a middle phalanx pivotally coupled to the proximal phalanx at a proximal joint and to the distal phalanx at the distal joint; and
wherein the dorsal actuation system further comprises:
middle bell cranks associated with each of the fingers, respectively, each middle bell crank being pivotally coupled to the proximal phalanx at the proximal joint along with the distal phalanx of the fingers, respectively; and
middle links associated with each of the fingers, respectively, each middle link being pivotally coupled to and between each middle bell crank, respectively, and each distal phalanx, respectively, of the fingers, and being positioned at the dorsal side of each middle phalanx of the fingers, respectively.

11. The robotic end-effector of claim 1, further comprising a guard disposed over the dorsal side of the palm and over one or more of the actuators.

12. The robotic end-effector of claim 1, wherein at least one of the actuators is disposed at least partially within an envelope of the hand, and at least one of actuators is disposed outside the envelope of the hand.

13. A robotic end-effector, comprising:
an anthropomorphic hand comprising:
a palm with a palmar side and a dorsal side;
fingers pivotally coupled to the palm and pivotal between extension and flexion; and
a thumb pivotally coupled to the palm and pivotal between abduction and adduction, and also pivotal between extension and flexion, each of the fingers and the thumb comprising phalanges comprising at least:
a proximal phalanx pivotally coupled to the palm at a metacarpo-phalangeal joint;
a distal phalanx pivotal with respect to the proximal phalanx about a distal joint; and
a ventral side and a dorsal side; and
a dorsal actuation system for actuating the fingers and the thumb, the dorsal actuation system being supported on the dorsal side of the palm and the dorsal sides of the fingers and the thumb, the dorsal actuation system comprising:
actuators associated with each of the fingers and the thumb, respectively, each actuator being supported on the palm and positioned on the dorsal side of the palm;
proximal bell cranks associated with each of the fingers and the thumb, respectively, each proximal bell crank being pivotally coupled to the palm along with the proximal phalanx of each of the fingers and the thumb, respectively; and
proximal dorsal links associated with each of the fingers and the thumb, respectively, each proximal dorsal link being pivotally coupled between the proximal bell crank and the distal phalanx of each finger and the thumb, respectively, and positioned at the dorsal side of the proximal phalanx of each finger and the thumb, respectively,
wherein the actuators are operable to extend the proximal bell cranks and the proximal dorsal links to pivot the proximal and distal phalanges in flexion, and
wherein the distal phalanx of each of the fingers and the thumb comprises a respective protrusion extending therefrom at the distal joint, the proximal dorsal links of the fingers and the thumb, respectively, being pivotally coupled to the protrusions, respectively.

14. The robotic end-effector of claim 13, wherein all actuation components of the fingers and the thumb are supported on the robotic end-effector including all actuators and all links coupled to the fingers and the thumb.

15. The robotic end-effector of claim 13, further comprising a releasable attachment interface at a proximal end of the palm configured to releasably attach the robotic end-effector to a robotic arm, without an actuator or actuator link spanning across the attachment interface, and defining a modular robotic end-effector.

16. The robotic end-effector of claim 13, wherein the proximal phalanx of the thumb has a pair of pivots with respect to the palm including a first pivot in which the thumb is operable to pivot in abduction/adduction and a second pivot in which the proximal phalanx of the thumb is operable to pivot in flexion/extension.

17. The robotic end-effector of claim 13, wherein thumb is movable between retroposition and anteposition.

18. The robotic end-effector of claim 13, wherein the actuators comprise a pair of thumb actuators associated with the thumb.

19. The robotic end-effector of claim 18, wherein
the thumb further comprises a yoke pivotally coupled to the palm, and the proximal phalanx of the thumb is pivotally coupled to the yoke;
a first thumb actuator of the pair of thumb actuators is supported on the yoke and coupled to the proximal phalanx of the thumb, the first thumb actuator being operable to pivot the proximal phalanx and the distal phalanx of the thumb about a first axis in extension/flexion; and
a second thumb actuator of the pair of thumb actuators is supported on the dorsal side of the palm and coupled to the yoke, the second thumb actuator being operable to pivot the yoke about a second axis to pivot the yoke, the proximal phalange, and the distal phalange of the thumb in an abduction/adduction direction between retroposition and anteposition.

20. The robotic end-effector of claim 13, wherein the dorsal actuation system further comprises metacarpo-phalangeal springs associated with each of the fingers and the thumb, respectively, each metacarpo-phalangeal spring being coupled to the metacarpo-phalangeal joint and biasing the proximal phalanx of each of the fingers and the thumb, respectively, in extension, and a distal springs associated with each of the fingers and the thumb, the distal springs being coupled to the distal joint and biasing the distal phalanx of each of the fingers and the thumb, respectively, in extension.

21. The robotic end-effector of claim 13, wherein each of the fingers further comprises:
a middle phalanx pivotally coupled to the proximal phalanx at a proximal joint and to the distal phalanx at the distal joint; and
wherein the dorsal actuation system further comprises:
middle bell cranks associated with each of the fingers, respectively, each middle bell crank being pivotally coupled to the proximal phalanx at the proximal joint along with the distal phalanx of the fingers, respectively; and
middle links associated with each of the fingers, each middle link being pivotally coupled to and between each middle bell crank, respectively, and each distal phalanx, respectively, of the fingers, and being positioned at the dorsal side of each middle phalanx of the fingers, respectively.

22. The robotic end-effector of claim 13, further comprising a guard disposed over the dorsal side of the palm and over one or more of the actuators.

23. The robotic end-effector of claim 13, wherein at least one of the actuators is disposed at least partially within an envelope of the hand, and at least one of actuators is disposed outside the envelope of the hand.

24. The robotic end-effector of claim 13, wherein the actuators associated with each of the fingers are positioned on the dorsal side of the palm to be parallel with a corresponding finger but offset from the corresponding finger.

25. A robotic end-effector, comprising:
an anthropomorphic hand comprising:
a palm with a palmar side and a dorsal side;
fingers pivotally coupled to the palm and pivotal between extension and flexion; and
a thumb pivotally coupled to the palm and pivotal between abduction and adduction, and also pivotal between extension and flexion, each of the fingers and the thumb comprising phalanges comprising at least:
a proximal phalanx pivotally coupled to the palm at a metacarpo-phalangeal joint;
a distal phalanx pivotal with respect to the proximal phalanx about a distal joint; and
a ventral side and a dorsal side; and
a dorsal actuation system for actuating the fingers and the thumb, the dorsal actuation system being supported on the dorsal side of the palm and the dorsal sides of the fingers and the thumb, the dorsal actuation system comprising:
actuators associated with each of the fingers and the thumb, respectively, each actuator being supported on the palm and positioned on the dorsal side of the palm;
proximal bell cranks associated with each of the fingers and the thumb, respectively, each proximal bell crank being pivotally coupled to the palm along with the proximal phalanx of each of the fingers and the thumb, respectively; and
proximal dorsal links associated with each of the fingers and the thumb, respectively, each proximal dorsal link being pivotally coupled between the proximal bell crank and the distal phalanx of each finger and the thumb, respectively, and positioned at the dorsal side of the proximal phalanx of each finger and the thumb, respectively,
wherein the actuators are operable to extend the proximal bell cranks and the proximal dorsal links to pivot the proximal and distal phalanges in flexion, and
wherein the dorsal actuation system further comprises metacarpo-phalangeal springs associated with each of the fingers and the thumb, respectively, each metacarpo-phalangeal spring being coupled to the metacarpo-phalangeal joint and biasing the proximal phalanx of each of the fingers and the thumb, respectively, in extension, and a distal springs associated with each of the fingers and the thumb, the distal springs being coupled to the distal joint and biasing the distal phalanx of each of the fingers and the thumb, respectively, in extension.

26. The robotic end-effector of claim 25, wherein all actuation components of the fingers and the thumb are supported on the robotic end-effector including all actuators and all links coupled to the fingers and the thumb.

27. The robotic end-effector of claim 25, further comprising a releasable attachment interface at a proximal end of the palm configured to releasably attach the robotic end-effector to a robotic arm, without an actuator or actuator link spanning across the attachment interface, and defining a modular robotic end-effector.

28. The robotic end-effector of claim 25, wherein the proximal phalanx of the thumb has a pair of pivots with respect to the palm including a first pivot in which the thumb is operable to pivot in abduction/adduction and a second pivot in which the proximal phalanx of the thumb is operable to pivot in flexion/extension.

29. The robotic end-effector of claim 25, wherein thumb is movable between retroposition and anteposition.

30. The robotic end-effector of claim 25, wherein the actuators comprise a pair of thumb actuators associated with the thumb.

31. The robotic end-effector of claim 30, wherein
the thumb further comprises a yoke pivotally coupled to the palm, and the proximal phalanx of the thumb is pivotally coupled to the yoke;
a first thumb actuator of the pair of thumb actuators is supported on the yoke and coupled to the proximal phalanx of the thumb, the first thumb actuator being operable to pivot the proximal phalanx and the distal phalanx of the thumb about a first axis in extension/flexion; and
a second thumb actuator of the pair of thumb actuators is supported on the dorsal side of the palm and coupled to the yoke, the second thumb actuator being operable to pivot the yoke about a second axis to pivot the yoke, the proximal phalange, and the distal phalange of the thumb in an abduction/adduction direction between retroposition and anteposition.

32. The robotic end-effector of claim 25, wherein the distal phalanx of each of the fingers and the thumb comprises a respective protrusion extending therefrom at the distal joint, the proximal dorsal links of the fingers and the thumb, respectively, being pivotally coupled to the protrusions, respectively.

33. The robotic end-effector of claim 25, wherein each of the fingers further comprises:
a middle phalanx pivotally coupled to the proximal phalanx at a proximal joint and to the distal phalanx at the distal joint; and
wherein the dorsal actuation system further comprises:
middle bell cranks associated with each of the fingers, respectively, each middle bell crank being pivotally coupled to the proximal phalanx at the proximal joint along with the distal phalanx of the fingers, respectively; and
middle links associated with each of the fingers, each middle link being pivotally coupled to and between each middle bell crank, respectively, and each distal phalanx, respectively, of the fingers, and being positioned at the dorsal side of each middle phalanx of the fingers, respectively.

34. The robotic end-effector of claim 25, further comprising a guard disposed over the dorsal side of the palm and over one or more of the actuators.

35. The robotic end-effector of claim 25, wherein at least one of the actuators is disposed at least partially within an envelope of the hand, and at least one of actuators is disposed outside the envelope of the hand.

36. The robotic end-effector of claim 25, wherein the actuators associated with each of the fingers are positioned on the dorsal side of the palm to be parallel with a corresponding finger but offset from the corresponding finger.

37. A robotic end-effector, comprising:
an anthropomorphic hand comprising:
a palm with a palmar side and a dorsal side;
fingers pivotally coupled to the palm and pivotal between extension and flexion, each of the fingers comprising:
a proximal phalanx pivotally coupled to the palm at a metacarpo-phalangeal joint;
a distal phalanx pivotal with respect to the proximal phalanx about a distal joint; and
a ventral side and a dorsal side; and
a thumb pivotally coupled to the palm and pivotal between abduction and adduction, and also pivotal between extension and flexion, the thumb comprising:
a yoke pivotally coupled to the palm;
a proximal phalanx pivotally coupled to the yoke at a metacarpo-phalangeal joint;
a distal phalanx pivotal with respect to the proximal phalanx about a distal joint; and
a ventral side and a dorsal side, and
a dorsal actuation system for actuating the fingers and the thumb, the dorsal actuation system being supported on the dorsal side of the palm and the dorsal sides of the fingers and the thumb, the dorsal actuation system comprising:
actuators associated with each of the fingers, respectively, each actuator being supported on the palm and positioned on the dorsal side of the palm;
proximal bell cranks associated with each of the fingers, respectively, each proximal bell crank being pivotally coupled to the palm along with the proximal phalanx of each of the fingers, respectively;
proximal dorsal links associated with each of the fingers, respectively, each proximal dorsal link being pivotally coupled between the proximal bell crank and the distal phalanx of each finger, respectively, and positioned at the dorsal side of the proximal phalanx of each finger, respectively, wherein the actuators are operable to extend the proximal bell cranks and the proximal dorsal links to pivot the proximal and distal phalanges in flexion;
a first thumb actuator supported on the yoke and coupled to the proximal phalanx of the thumb, the first thumb actuator being operable to pivot the proximal phalanx and the distal phalanx of the thumb about a first axis in extension/flexion;
a second thumb actuator supported on the dorsal side of the palm and coupled to the yoke, the second thumb actuator being operable to pivot the yoke about a second axis to pivot the yoke, the proximal phalange, and the distal phalange of the thumb in an abduction/adduction direction between retroposition and anteposition.

38. The robotic end-effector of claim 37, wherein all actuation components of the fingers and the thumb are supported on the robotic end-effector including all actuators and all links coupled to the fingers and the thumb.

39. The robotic end-effector of claim 37, further comprising a releasable attachment interface at a proximal end of the palm configured to releasably attach the robotic end-effector to a robotic arm, without an actuator or actuator link spanning across the attachment interface, and defining a modular robotic end-effector.

40. The robotic end-effector of claim 37, wherein the distal phalanx of each of the fingers and the thumb comprises a respective protrusion extending therefrom at the distal joint, the proximal dorsal links of the fingers and the thumb, respectively, being pivotally coupled to the protrusions, respectively.

41. The robotic end-effector of claim 37, wherein the dorsal actuation system further comprises metacarpo-phalangeal springs associated with each of the fingers and the thumb, respectively, each metacarpo-phalangeal spring being coupled to the metacarpo-phalangeal joint and biasing the proximal phalanx of each of the fingers and the thumb, respectively, in extension, and a distal springs associated with each of the fingers and the thumb, the distal springs being coupled to the distal joint and biasing the distal phalanx of each of the fingers and the thumb, respectively, in extension.

42. The robotic end-effector of claim 37, wherein each of the fingers further comprises:
   a middle phalanx pivotally coupled to the proximal phalanx at a proximal joint and to the distal phalanx at the distal joint; and
   wherein the dorsal actuation system further comprises:
   middle bell cranks associated with each of the fingers, respectively, each middle bell crank being pivotally coupled to the proximal phalanx at the proximal joint along with the distal phalanx of the fingers, respectively; and
   middle links associated with each of the fingers, each middle link being pivotally coupled to and between each middle bell crank, respectively, and each distal phalanx, respectively, of the fingers, and being positioned at the dorsal side of each middle phalanx of the fingers, respectively.

43. The robotic end-effector of claim 37, further comprising a guard disposed over the dorsal side of the palm and over one or more of the actuators.

44. The robotic end-effector of claim 37, wherein at least one of the actuators is disposed at least partially within an envelope of the hand, and at least one of actuators is disposed outside the envelope of the hand.

45. The robotic end-effector of claim 37, wherein the actuators associated with each of the fingers are positioned on the dorsal side of the palm to be parallel with a corresponding finger but offset from the corresponding finger.

\* \* \* \* \*